(12) United States Patent
Omote

(10) Patent No.: US 11,893,184 B2
(45) Date of Patent: Feb. 6, 2024

(54) OPERATING BODY DETECTION DEVICE, DETECTION METHOD FOR OPERATING BODY, AND I/O DEVICE

(71) Applicant: IDEAL STAR INC., Sendai (JP)

(72) Inventor: Kenji Omote, Sendai (JP)

(73) Assignee: IDEAL STAR INC., Sendai (JP)

( * ) Notice: Subject to any disclaimer, the term of this patent is extended or adjusted under 35 U.S.C. 154(b) by 44 days.

(21) Appl. No.: 17/642,116

(22) PCT Filed: Aug. 20, 2020

(86) PCT No.: PCT/JP2020/031506
§ 371 (c)(1),
(2) Date: Mar. 10, 2022

(87) PCT Pub. No.: WO2021/070485
PCT Pub. Date: Apr. 15, 2021

(65) Prior Publication Data
US 2023/0004252 A1 Jan. 5, 2023

(30) Foreign Application Priority Data

Oct. 7, 2019 (JP) .................................. 2019-184438

(51) Int. Cl.
*G06F 3/041* (2006.01)
*G06F 3/044* (2006.01)
(Continued)

(52) U.S. Cl.
CPC ............. *G06F 3/0418* (2013.01); *G01D 5/24* (2013.01); *G01L 1/16* (2013.01); *G06F 3/0446* (2019.05);
(Continued)

(58) Field of Classification Search
CPC ................. G06F 3/0418; G06F 3/0446; G06F 2203/04105; G06F 2203/04111; G01D 5/24; G01L 1/16
See application file for complete search history.

(56) References Cited

U.S. PATENT DOCUMENTS 9,612,690 B2 * 4/2017 Zirkl .................. G06F 3/04186
2015/0153887 A1 6/2015 Kim et al.
(Continued)

FOREIGN PATENT DOCUMENTS

JP 2013-257642 A 12/2013
JP 2015-75892 A 4/2015
(Continued)

OTHER PUBLICATIONS

Machine translation of WO 2019/035421 (Year: 2023).*
(Continued)

*Primary Examiner* — Michael Pervan
(74) *Attorney, Agent, or Firm* — Hamre, Schumann, Mueller & Larson, P.C.

(57) ABSTRACT

An object is to provide an operating body detection device having improved reliability of a capacitance-type sensor in input detection. An operating body detection device comprising: a capacitance-type sensor having a capacitance sensing surface on which a plurality of sensing electrodes is arranged; and a heat source sensing sensor comprising a heat source sensing film having a heat source sensing membrane with a heat source sensing surface. The detection surface that detects an operating body may have a region in which the capacitance sensing surface and the heat source sensing surface overlap when viewed from a normal direction of the detection surface. Preferably, the control unit that controls the capacitance-type sensor and the heat source sensing sensor starts heat source measurement with the heat source (Continued)

sensing sensor on condition that an object is detected with the capacitance-type sensor.

18 Claims, 33 Drawing Sheets

(51) Int. Cl.
*G01D 5/24* (2006.01)
*G01L 1/16* (2006.01)

(52) U.S. Cl.
CPC .............. *G06F 2203/04105* (2013.01); *G06F 2203/04111* (2013.01)

(56) References Cited

U.S. PATENT DOCUMENTS

| | | | |
|---|---|---|---|
| 2015/0339001 A1* | 11/2015 | Zirkl | ................... G06F 3/04186 345/177 |
| 2019/0220115 A1 | 7/2019 | Mori et al. | |
| 2021/0135089 A1 | 5/2021 | Omote et al. | |

FOREIGN PATENT DOCUMENTS

| | | |
|---|---|---|
| JP | 2015-534667 A | 12/2015 |
| JP | 2017-33593 A | 2/2017 |
| JP | 2018-181066 A | 11/2018 |
| JP | 2019-125218 A | 7/2019 |
| WO | 2015/053345 A1 | 4/2015 |
| WO | 2018/139190 A1 | 8/2018 |
| WO | 2019/035421 A1 | 2/2019 |

OTHER PUBLICATIONS

Machine translation of JP 2013/257642 (Year: 2023).*
Machine translation of WO 2015/053345 (Year: 2023).*
International Search Report and Written Opinion, International Patent Application No. PCT/JP2020/031506, with English translation of Search Report (12 pages).
Supplementary Partial European Search Report issued in European Patent Application No. 20875510.8, dated Oct. 19, 2022 (13 pages).

* cited by examiner (a)

(b)

(a)

(b)

(a)

(b)

(a)

(b)

(a)

(b)

(a)

(b)

(a)

(b)

(c)

(a)

(b)

(a)

(b)

(a)

(b)

(c)

OPERATING BODY DETECTION DEVICE, DETECTION METHOD FOR OPERATING BODY, AND I/O DEVICE

TECHNICAL FIELD

The present invention relates to an operating body detection device, a detection method for an operating body, and an input/output (I/O) device.

BACKGROUND ART

A capacitance-type sensor includes a transparent electrode member having transparent electrodes to detect the position of a portion in contact with an operating body without deteriorating the visibility of an image displayed on the screen. As the transparent electrode member, an oxide-based material such as indium/tin oxide (ITO) or a thin metal wire (e.g., Patent Document 1) is used.

Patent Document 2 discloses a piezoelectric membrane including a copolymer of vinylidene fluoride (VDF) and trifluoroethylene (TrFE) {this copolymer is written as P(VDF/TrFE) or written exclusively as PVT by simplifying}. This copolymer is composed of a mixture of at least two kinds of copolymers (a first copolymer PVT1 and a second copolymer PVT2). The first copolymer PVT1 is selected from those having a copolymerization ratio of VDF: 82 to 90% versus TrFE: 18 to 10% in molar ratio. The second copolymer PVT2 is selected from those having a copolymerization ratio of VDF: 60 to 82% versus TrFE: 40 to 18% in molar ratio.

PRIOR ART DOCUMENTS

Patent Documents

[Patent Document 1] JP2018-181066A
[Patent Document 2] WO2018/139190

SUMMARY OF THE INVENTION

Problems to be Solved by the Invention

Objects of the present invention include providing an operating body detection device having improved reliability of input detection with a capacitance-type sensor. Objects of the present invention further include providing a detection method for an operating body using the operating body detection device and providing an input/output device comprising the operating body detection device.

Means for Solving the Problems

The present invention provided to solve the above problems includes the following aspects.
(1) An operating body detection device comprising: a capacitance-type sensor having a capacitance sensing surface on which a plurality of sensing electrodes is arranged; and a heat source sensing sensor comprising a heat source sensing film having a heat source sensing membrane with a heat source sensing surface.
(2) The operating body detection device according to the above (1), wherein a detection surface that detects an operating body has a region in which the capacitance sensing surface and the heat source sensing surface overlap when viewed from a normal direction of the detection surface.
(3) The operating body detection device according to the above (1) or the above (2), wherein the heat source sensing membrane has a light transmittance of 90% or more in a wavelength range of 380 nm to 800 nm.
(4) The operating body detection device according to any one of the above (1) to the above (3), comprising a control unit that controls the capacitance-type sensor and the heat source sensing sensor, wherein the control unit starts heat source measurement with the heat source sensing sensor on condition that an object is detected with the capacitance-type sensor.
(5) An operating body detection device comprising: a capacitance-type sensor having a capacitance sensing surface on which a plurality of sensing electrodes is arranged; and a pressure sensor comprising a pressure sensing film that has a piezoelectric membrane having a pressure-sensitive surface and two conductive membranes provided so as to sandwich the piezoelectric membrane, wherein a detection surface that detects an operating body has a region in which the capacitance sensing surface and the pressure-sensitive surface overlap when viewed from a normal direction of the detection surface.
(6) The operating body detection device according to the above (5), wherein the piezoelectric membrane has a light transmittance of 90% or more in a wavelength range of 380 nm to 800 nm.
(7) The operating body detection device according to the above (5) or the above (6), comprising a control unit that controls the capacitance-type sensor and the pressure sensor, wherein the control unit starts pressure measurement with the pressure sensor on condition that an object is detected with the capacitance-type sensor.
(8) The operating body detection device according to any one of the above (5) to the above (7), comprising a heat source sensing sensor comprising a heat source sensing film having a heat source sensing membrane with a heat source sensing surface.
(9) The operating body detection device according to the above (8), wherein the heat source sensing membrane has a light transmittance of 90% or more in a wavelength range of 380 nm to 800 nm.
(10) The operating body detection device according to the above (8) or the above (9), wherein the detection surface has a region overlapping the heat source sensing surface when viewed from the normal direction of the detection surface.
(11) The operating body detection device according to any one of the above (8) to the above (10), wherein the piezoelectric membrane has a function of the heat source sensing membrane.
(12) The operating body detection device according to the above (11), wherein the piezoelectric membrane outputs an output signal related to heat source sensing via the two conductive membranes.
(13) The operating body detection device according to any one of the above (8) to the above (12), having a region in which the pressure-sensitive surface and the heat source sensing surface overlap when viewed from the normal direction of the detection surface.
(14) The operating body detection device according to any one of the above (8) to the above (13), comprising a control unit that controls the capacitance-type sensor, the pressure sensor, and the heat source sensing sensor, wherein the control unit starts pressure measurement with the pressure sensor on condition that an object is detected with the capacitance-type sensor, and starts heat source measurement with the heat source sensing sensor on condition that pressure is detected with the pressure sensor.
(15) The operating body detection device according to any one of the above (8) to the above (13), comprising a control unit that controls the capacitance-type sensor, the pressure sensor, and the heat source sensing sensor, wherein the control unit starts heat source measurement with the heat source sensing sensor on condition that an object is detected with the capacitance-type sensor, and starts pressure measurement with the pressure sensor on condition that a heat source is detected with the heat source sensing sensor.
(16) The operating body detection device according to any one of the above (5) to the above (15), wherein the pressure sensor can measure a degree of pressing by the operating body with a plurality of gradations.
(17) The operating body detection device according to any one of the above (5) to the above (16), wherein at least one of the two conductive membranes is patterned, and the pressure sensor can individually detect pressure at a plurality of positions in the pressure-sensitive surface.
(18) The operating body detection device according to the above (17), comprising a control unit that controls the capacitance-type sensor and the pressure sensor, wherein, on condition that an object is detected with the capacitance-type sensor, the control unit measures the pressure using a pattern of the patterned conductive membrane at which coordinates on the pressure-sensitive surface corresponding to coordinates of the object detected with the capacitance-type sensor on the capacitance sensing surface are positioned.
(19) The operating body detection device according to the above (17) or the above (18), wherein at least one patterned conductive membrane of the two conductive membranes forms a part of the plurality of sensing electrodes of the capacitance-type sensor.
(20) The operating body detection device according to any one of the above (5) to the above (19), wherein the sensing electrodes of the capacitance-type sensor are arranged proximal to the operating body with respect to the pressure sensing film.
(21) A detection method for an operating body using the operating body detection device according to any one of the above (5) to the above (20), comprising, when sensing an object with the capacitance-type sensor and sensing pressing by the object with the pressure sensor, determining that the object sensed with the capacitance-type sensor is the operating body.
(22) A detection method for an operating body using the operating body detection device according to any one of the above (16) to the above (20), wherein the pressure sensor senses a degree of pressing by the operating body with a plurality of gradations.
(23) A detection method for an operating body using the operating body detection device according to any one of the above (17) to the above (20), wherein in-plane resolution of capacitance change measurement on the capacitance sensing surface of the capacitance-type sensor is higher than in-plane resolution of pressure measurement on the pressure-sensitive surface of the pressure sensor.
(24) A detection method for an operating body using the operating body detection device according to any one of the above (17) to the above (20), wherein the pressure sensor can divisionally measure pressure on the pressure-sensitive surface, wherein, on condition that an object is detected with the capacitance-type sensor, the pressure sensor measures the pressure using a portion of the pressure-sensitive surface at which coordinates on the pressure-sensitive surface corresponding to coordinates of the object detected with the capacitance-type sensor on the capacitance sensing surface are positioned.
(25) The detection method for an operating body according to any one of the above (21) to the above (24), comprising starting sensing with the pressure sensor on condition that an object is detected with the capacitance-type sensor.
(26) A detection method for an operating body using the operating body detection device according to any one of the above (1) to the above (3) or any one of the above (8) to the above (13), comprising, when sensing presence of an object around the capacitance sensing surface with the capacitance-type sensor and sensing presence of a heat source around the heat source sensing surface with the heat source sensing sensor, determining that the object sensed with the capacitance-type sensor is the operating body.
(27) The detection method for an operating body according to the above (26), comprising starting heat source measurement with the heat source sensing sensor on condition that the object is detected with the capacitance-type sensor.
(28) An input/output device comprising: an operating body detection device according to any one of the above (1) to the above (20); and a display device provided on a surface of the operating body detection device opposite to an operation side, wherein the operating body detection device has translucency, and at least a part of an image from the display device can be visually recognized from the operation side of the operating body detection device.
(29) The input/output device according to the above (28), having a decorative layer on the operation side of the operating body detection device.

Effect of the Invention

According to the present invention, there is provided an operating body detection device having improved reliability of input detection with the capacitance-type sensor.

EMBODIMENTS FOR CARRYING OUT THE INVENTION

Figure 1:
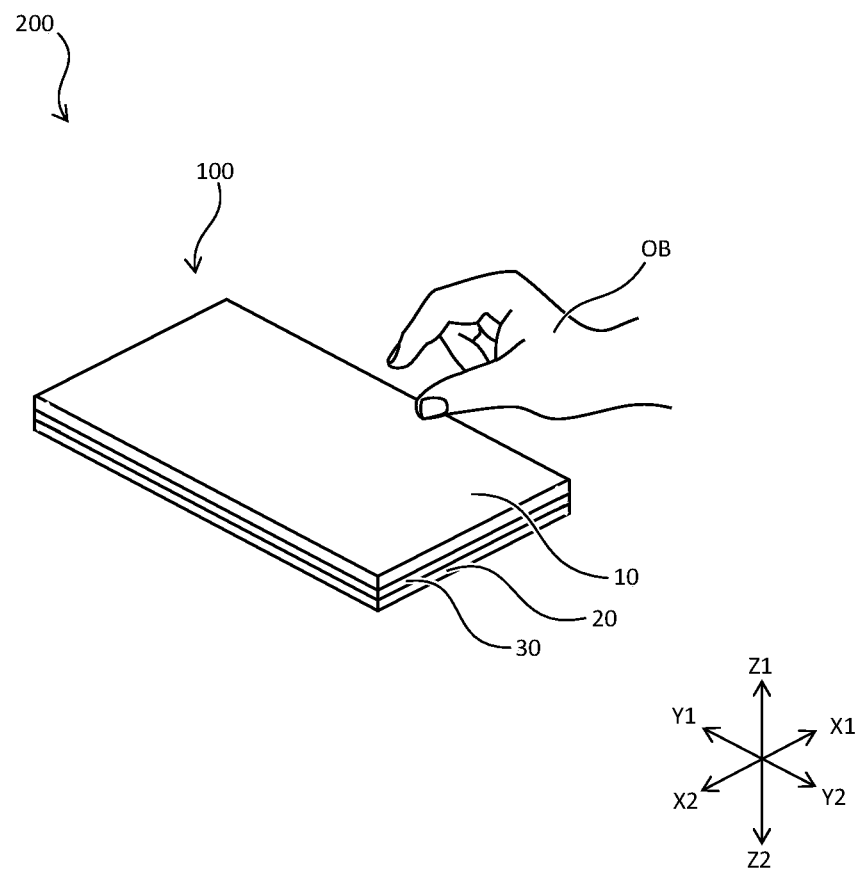
FIG. 1 is a diagram conceptually illustrating an operating body detection device according to a first embodiment of the present invention.

Hereinafter, embodiments of the present invention will be described with reference to the drawings. In the drawings, similar components are designated by the same reference numerals and detailed description will be omitted as appropriate.

FIG. 1 is a diagram conceptually illustrating an operating body detection device according to a first embodiment of the present invention. FIG. 2(a) is a plan view conceptually illustrating the structure of a capacitance-type sensor included in the operating body detection device of FIG. 1. FIG. 2(b) is a cross-sectional view taken along the section line I-I of FIG. 1(a). FIG. 3(a) is a plan view conceptually illustrating the structure of a pressure sensor included in the operating body detection device of FIG. 1. FIG. 3(b) is a cross-sectional view taken along the section line II-II of FIG. 1(a). FIG. 4 is a cross-sectional view (X-Z plane) of a laminated structure of the operating body detection device of FIG. 1.

As illustrated in FIG. 1, an operating body detection device 200 according to the first embodiment of the present invention includes a laminated structure 100 configured such that a capacitance-type sensor 10, a transparent joining member 30, and a pressure sensor 20 are laminated in this order from an operating body OB side (Z1 side in the Z1-Z2 direction).

Figure 2:
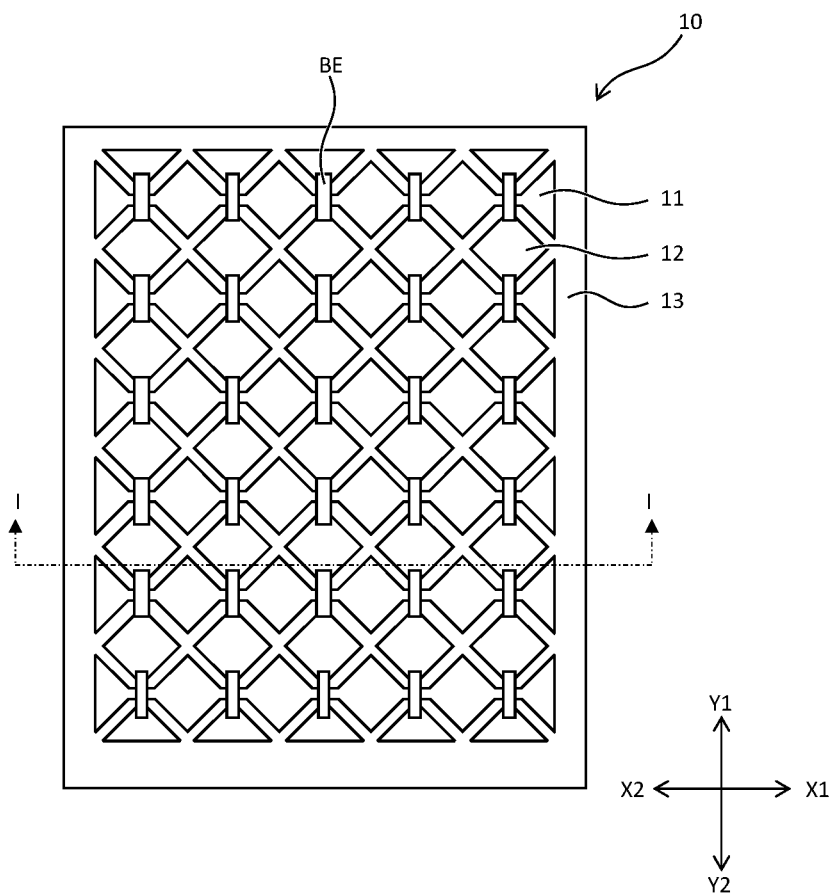
FIG. 2(a) is a plan view conceptually illustrating the structure of a capacitance-type sensor included in the operating body detection device of FIG. 1.
FIG. 2(b) is a cross-sectional view taken along the section line I-I of FIG. 1(a).
Figure 2:
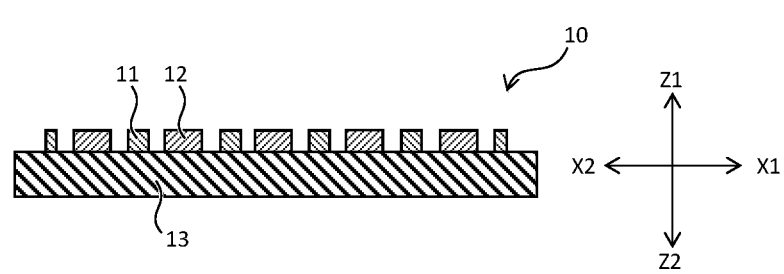

The capacitance-type sensor 10 is, for example, a capacitance-type sensor as described in Patent Document 1. Specifically, as illustrated in FIG. 2, a plurality of first electrodes 11 and a plurality of second electrodes 12 are arranged in the Y-axis direction and the X-axis direction, respectively, on one surface (Z1 side in the Z1-Z2 direction) of a translucent substrate 13 made of polyethylene terephthalate (PET) or the like. In each of the first electrodes 11, a plurality of diamond-shaped transparent electrodes is connected in the X-axis direction. Likewise, in each of the second electrodes 12, a plurality of diamond-shaped transparent electrodes is connected in the Y-axis direction. When the capacitance-type sensor 10 is viewed from the Z1 side in the Z1-Z2 direction, the region in which a plurality of sensing electrodes including the first electrodes 11 and the second electrodes 12 is arranged is a capacitance sensing surface.

The plurality of transparent electrodes constituting each first electrode 11 is coupled together via coupling portions that merge into the transparent electrodes. The coupling portions are made of a transparent conductive material. The plurality of transparent electrodes constituting each second electrode 12 is connected together via bridge wirings BE that electrically connects adjacent transparent electrodes. An insulating layer (not illustrated) is provided between the bridge wirings BE and the coupling portions.

It suffices that the materials constituting the transparent electrodes, the coupling portions, and the bridge wirings BE are translucent conductive materials. Examples of such materials include oxide materials such as indium/tin oxide (ITO) and composite materials including thin metal wires such as silver nanowires.

Figure 3:
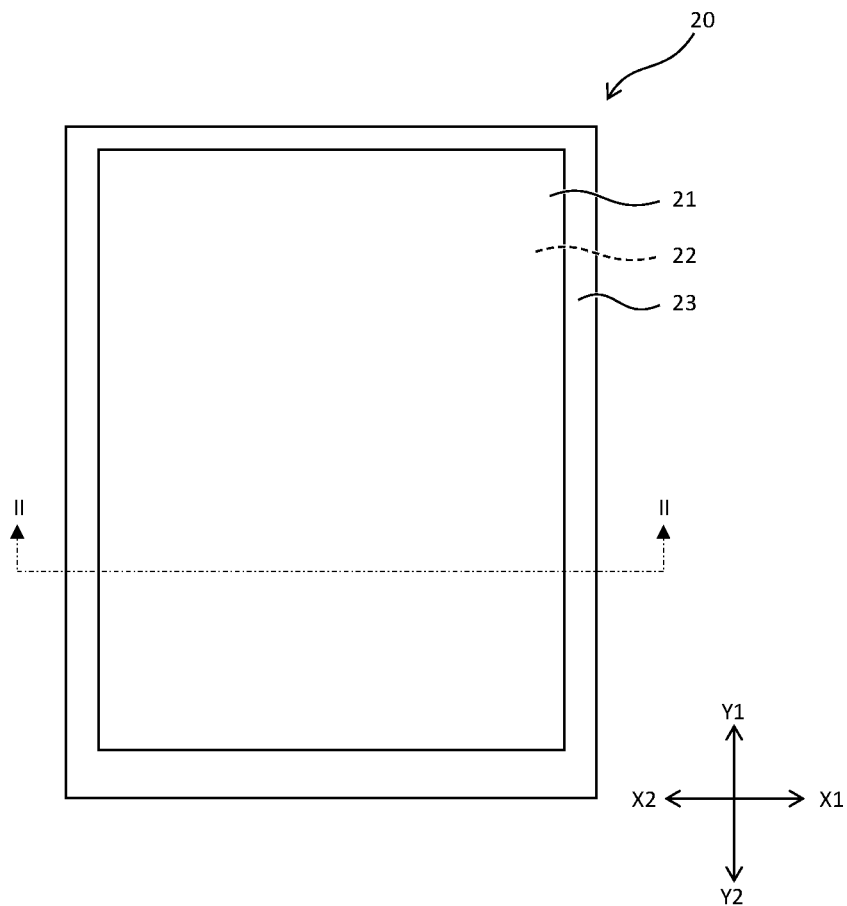
FIG. 3(a) is a plan view conceptually illustrating the structure of a pressure sensor included in the operating body detection device of FIG. 1.
FIG. 3(b) is a cross-sectional view taken along the section line II-II of FIG. 1(a).
Figure 3:
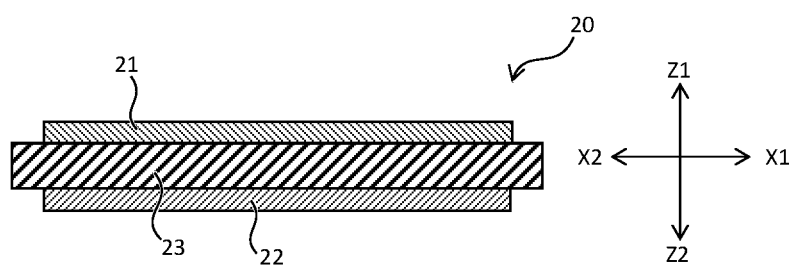
Figure 4:
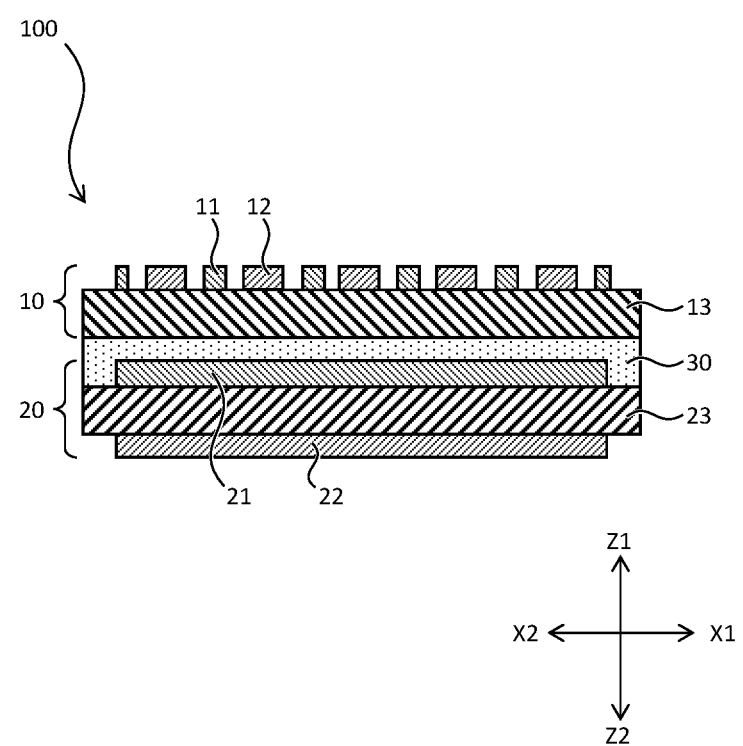
FIG. 4 is a cross-sectional view (X-Z plane) of a laminated structure of the operating body detection device of FIG. 1.

As illustrated in FIG. 3, the pressure sensor 20 includes a pressure sensing film that has a piezoelectric membrane 23 and two translucent conductive membranes (a first transparent conductive membrane 21 and a second transparent conductive membrane 22) provided on both sides of the piezoelectric membrane 23 in the membrane thickness direction. The sensing electrodes of the capacitance-type sensor 10 are arranged proximal to the operating body OB with respect to the pressure sensing film. When the pressure sensor 20 is viewed from the Z1-Z2 direction, the region in which the piezoelectric membrane 23, the first transparent conductive membrane 21, and the second transparent conductive membrane 22 overlap is a pressure-sensitive surface. When the pressure sensor 20 is used as a heat source sensing sensor, the piezoelectric membrane 23 functions as a heat source sensing membrane, and the above pressure sensing film functions as a heat source sensing film. Therefore, when the pressure sensor 20 is viewed from the Z1-Z2 direction, the region in which the above piezoelectric membrane 23, first transparent conductive membrane 21, and second transparent conductive membrane 22 overlap is a heat source sensing surface. The detection surface for the operating body detection device 200 to detect the operating body OB is provided as a region in which the capacitance sensing surface and the pressure-sensitive surface (which is equal to the heat source sensing surface in the present embodiment) overlap when viewed from the normal direction (Z1-Z2 direction) of the detection surface. In the present specification, the detection surface means a surface for detecting the operating body OB when the operating body detection device 200 is viewed from the side on which the operating body OB is located (Z1 side in the Z1-Z2 direction). Specifically, the detection surface is a surface including at least one of the capacitance sensing surface, the pressure-sensitive surface, and the heat source sensing surface. In the detection surface of the operating body detection device 200 according to the present embodiment, as described above, the capacitance sensing surface and the pressure-sensitive surface overlap on the entire surface, and the pressure-sensitive surface is the heat source sensing surface; therefore, the capacitance sensing surface, the pressure-sensitive surface, and the heat source sensing surface overlap on the entire surface.

Specific examples of the piezoelectric membrane 23 include a piezoelectric membrane disclosed in Patent Document 2. Such a piezoelectric membrane has a light transmittance of 90% or more in the wavelength range of 380 nm to 800 nm and is therefore excellent in translucency. It suffices that the materials constituting the first transparent conductive membrane 21 and the second transparent conductive membrane 22 are translucent conductive materials. Examples of such materials include oxide materials such as indium/tin oxide (ITO) and composite materials including thin metal wires such as silver nanowires.

As illustrated in FIG. 4, in the capacitance-type sensor 10 according to the present embodiment, the transparent joining member 30 is located between the Z2 side in the Z1-Z2 direction of the capacitance-type sensor 10 and the Z1 side in the Z1-Z2 direction of the pressure sensor 20. The transparent joining member 30 may be composed of an adhesive containing an epoxy resin or the like or may also be composed of an optical clear adhesive (OCA) containing an acrylic material. From the viewpoint of enhancing the detectability for the operating pressure of the operating body OB, the transparent joining member 30 may be preferably composed of a hard material.

Figure 5:
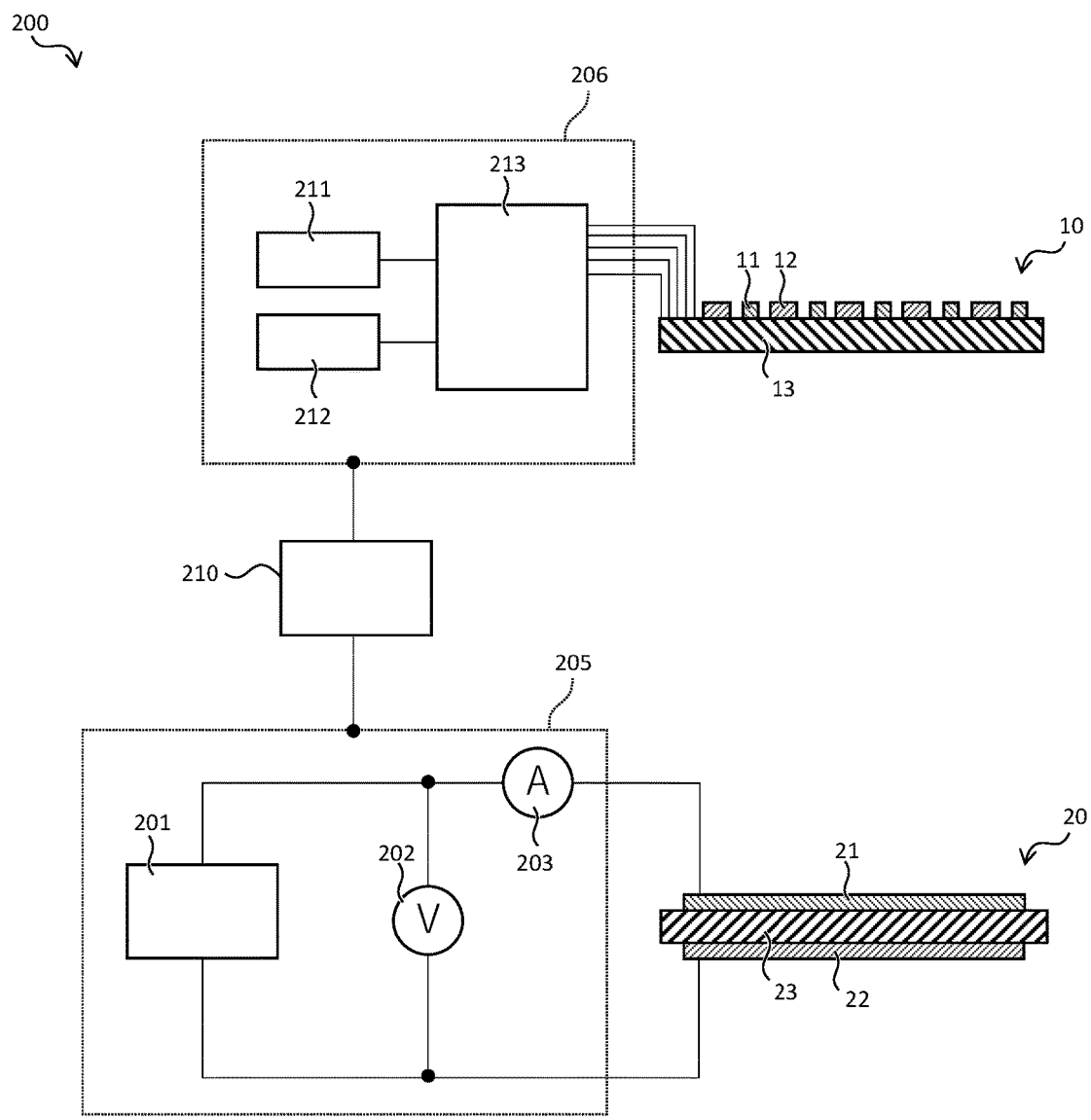
FIG. 5 is a block diagram illustrating the configuration of the operating body detection device of FIG. 1.

FIG. 5 is a block diagram illustrating the configuration of the operating body detection device of FIG. 1. As illustrated in FIG. 5, the capacitance-type sensor 10 uses a capacitance-type sensor circuit 206 to measure the capacitance. The capacitance-type sensor circuit 206 includes a drive unit 211, a detection unit 212, and a multiplexer 213 that allows the drive unit 211 to transmit the drive voltage to each of the first electrodes 11 and allows the detection unit 212 to detect respective signals from the second electrodes 12.

The pressure sensor 20 uses a pressure sensor circuit 205 to measure the pressure. The pressure sensor circuit 205 includes a power supply 201, a voltage measuring unit 202 that measures the voltage between the first transparent conductive membrane 21 and the second transparent conductive membrane 22, and a current measuring unit 203 that measures the current flowing through the piezoelectric membrane 23 between the first transparent conductive membrane 21 and the second transparent conductive membrane 22. The output of the voltage measuring unit 202 makes it possible to detect whether or not a force having a component in the membrane thickness direction is applied to the piezoelectric membrane 23 of the pressure sensor 20. The output of the current measuring unit 203 makes it possible to detect whether or not a heat source is present in the vicinity of the piezoelectric membrane 23 of the pressure sensor 20. That is, when sensing the output of the current measuring unit 203, the pressure sensor 20 functions as a heat source sensing sensor. When a heat source approaches the piezoelectric membrane 23, the piezoelectric membrane 23 generates a current, and this current is transmitted as an output signal from the piezoelectric membrane 23 to the first transparent conductive membrane 21 and the second transparent conductive membrane 22 and measured by the current measuring unit 203.

The capacitance-type sensor circuit 206 and the pressure sensor circuit 205 are controlled by a control unit 210.

Figure 6:
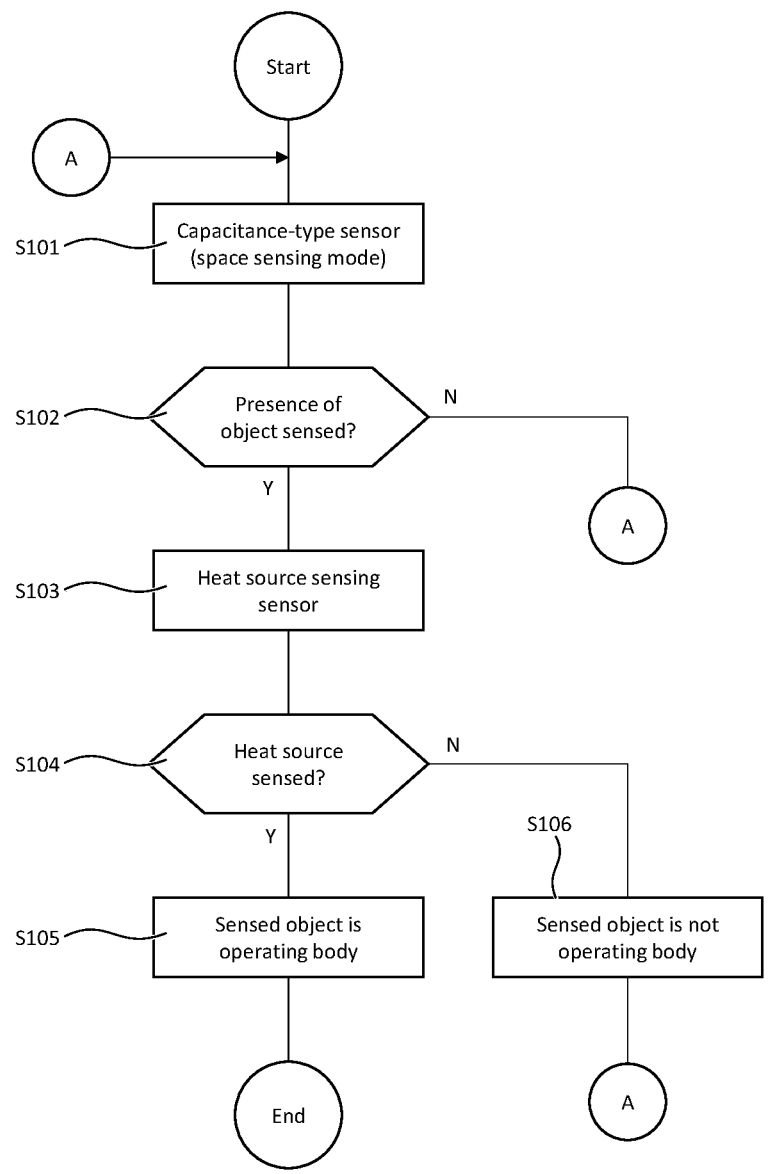
FIG. 6 is a flowchart illustrating a space sensing process executed by the operating body detection device of FIG. 1.

FIG. 6 is a flowchart illustrating a space sensing process (detection method) executed by the operating body detection device of FIG. 1. The capacitance-type sensor 10 of the operating body detection device 200 has two sensing modes: a contact sensing mode and a space sensing mode. The contact sensing mode is to detect a state in which the operating body OB is in contact with the sensing electrodes (the first electrodes 11 and the second electrodes 12) or is present in the immediate vicinity of the sensing electrodes. The space sensing mode is to detect the operating body OB located at a position away from the sensing electrodes by a predetermined distance (e.g., 5 cm or more). In the sensing modes, it is detected whether or not an object is present around the capacitance sensing surface. As will be described later, in an actual usage state, the operating body OB does not come into direct contact with the sensing electrodes of the capacitance-type sensor 10, but comes into contact via a cover panel 300. In the present specification, therefore, the "contact" regarding the operating body OB means not only the direct contact of the operating body OB with the sensing electrodes, but also means that the operating body OB is located in the vicinity at a distance of 1 mm or less from the sensing electrodes.

In the space sensing process executed by the operating body detection device 200, first, the capacitance-type sensor 10 is operated in the space sensing mode (step S101). It is confirmed whether or not the presence of an object is sensed (step S102), and when it is not sensed, the capacitance-type sensor 10 is continuously operated in the space sensing mode. When the presence of an object is sensed (i.e., on condition that the presence of an object is sensed), the pressure sensor 20 is made to function as a heat source sensing sensor, and heat source measurement is started (step S103). Specifically, the current measuring unit 203 is allowed to detect the signal. It is confirmed whether or not the heat source sensing sensor senses a heat source around the heat source sensing surface (step S104), and when it is sensed, a determination is made that the object sensed with the capacitance-type sensor 10 is the operating body OB (step S105). When a heat source is not sensed in step S104, a determination is made that the object sensed with the capacitance-type sensor 10 is not the operating body OB (step S106), and the capacitance-type sensor 10 is operated again in the space sensing mode.

Thus, by adding the process for confirming whether or not a heat source is also sensed upon the sensing of an object with the capacitance-type sensor 10, when the object sensed with the capacitance-type sensor 10 is another object (e.g., a PET bottle or a part of a hand-held bag carried by an operator) rather than the operating body OB, the possibility of misidentifying the object as the operating body OB is reduced. Moreover, the power consumption is reduced as compared with the case in which a heat source is constantly measured. The detection surface in this case is equal to the capacitance sensing surface.

Figure 7:
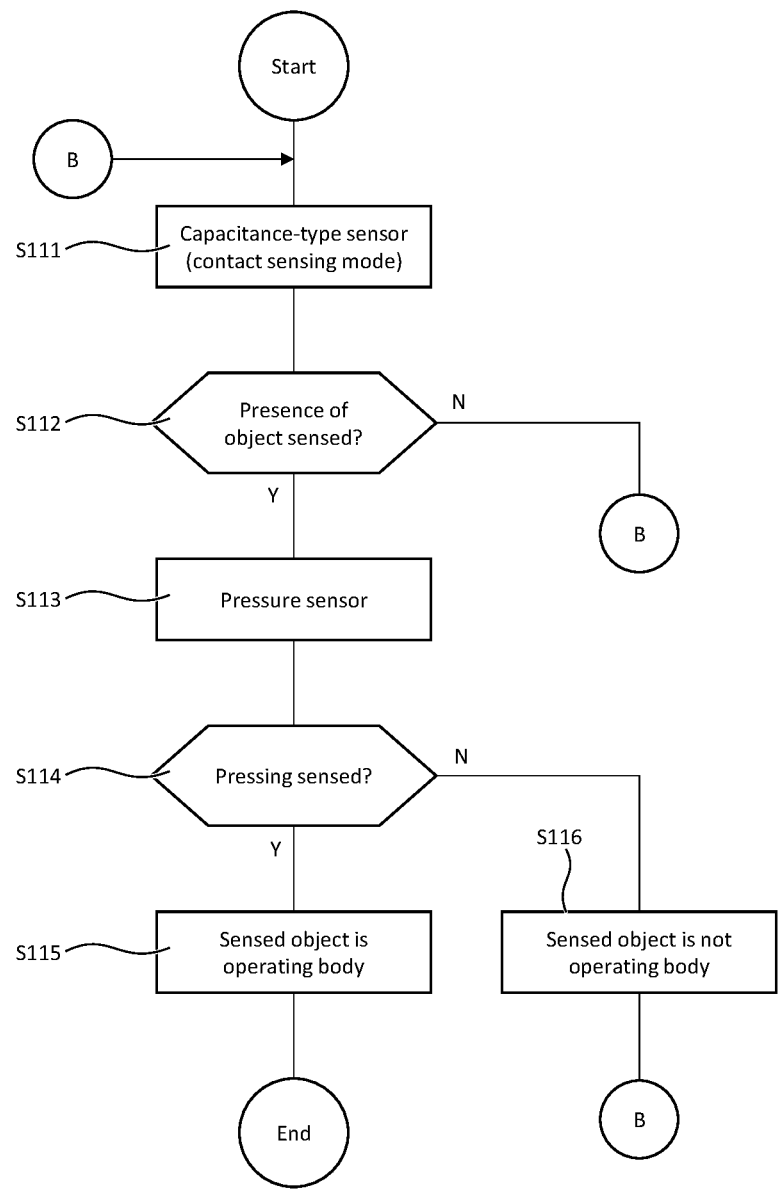
FIG. 7 is a flowchart illustrating a contact sensing process executed by the operating body detection device of FIG. 1.

FIG. 7 is a flowchart illustrating a contact sensing process (detection method) executed by the operating body detection device of FIG. 1. In the contact sensing process executed by the operating body detection device 200, first, the capacitance-type sensor 10 is operated in the contact sensing mode (step S111). It is confirmed whether or not the presence of an object is sensed (step S112), and when it is not sensed, the capacitance-type sensor 10 is continuously operated in the contact sensing mode. When the presence of an object is sensed, the pressure sensor 20 is made to function as a sensor for pressure, and pressure measurement is started (step S113). Specifically, the voltage measuring unit 202 is allowed to detect the signal. It is confirmed whether or not the pressure sensor 20 senses pressing (step S114), and when it is sensed, a determination is made that the object sensed with the capacitance-type sensor 10 is the operating body OB (step S115). When pressing is not sensed in step S114, a determination is made that the object sensed with the capacitance-type sensor 10 is not the operating body OB (step S116), and the capacitance-type sensor 10 is operated again in the contact sensing mode.

Thus, by adding the process for confirming whether or not pressing is also sensed upon the sensing of an object with the capacitance-type sensor 10, when the object sensed with the capacitance-type sensor 10 is another object (e.g., water droplet) rather than the operating body OB, the possibility of misidentifying the object as the operating body OB is reduced. Moreover, the power consumption is reduced as compared with the case in which the pressure is constantly measured. The detection surface in this case is equal to the region in which the capacitance sensing surface and the pressure-sensitive surface overlap.

Figure 8:
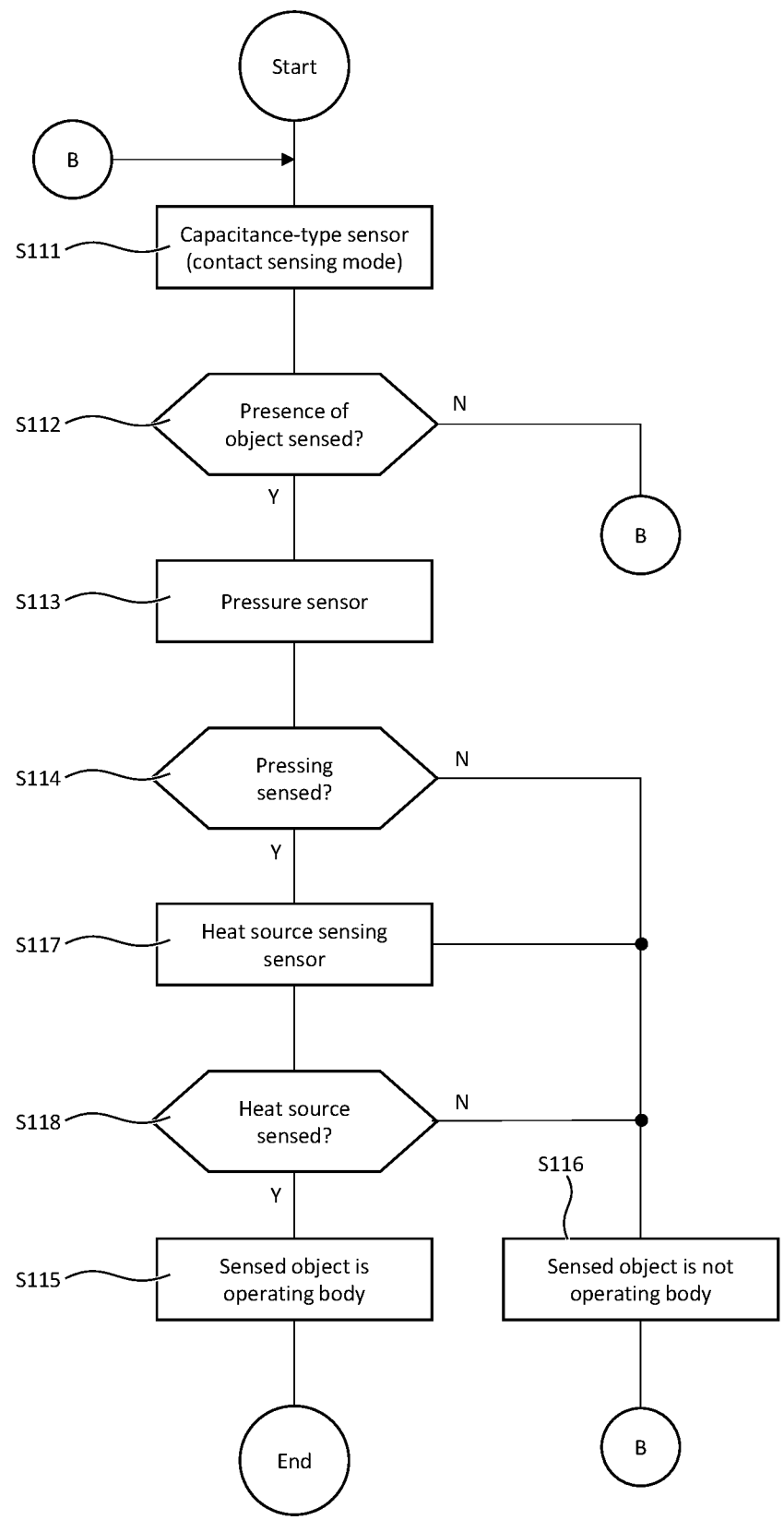
FIG. 8 is a flowchart illustrating another example of the contact sensing process executed by the operating body detection device of FIG. 1.

FIG. 8 is a flowchart illustrating another example of the contact sensing process (detection method) executed by the operating body detection device of FIG. 1. Explaining the difference from the contact sensing process according to the flowchart illustrated in FIG. 7, when the pressing is sensed in step S114, the pressure sensor 20 is made to function as a heat source sensing sensor and heat source measurement is started (step S117) before determining that the object sensed with the capacitance-type sensor 10 is the operating body OB (step S115). Specifically, the current measuring unit 203 is allowed to detect the signal. It is confirmed whether or not the heat source sensing sensor senses a heat source (step S118), and when it is sensed, a determination is made that the object sensed with the capacitance-type sensor 10 is the operating body OB (step S105). When a heat source is not sensed in step S118, a determination is made that the sensed object is not an operating body, and the capacitance-type sensor 10 is operated again in the contact sensing mode, as in the case in which the pressing is sensed in step S114.

Thus, by adding the process for confirming whether or not a heat source is sensed in addition to the process for confirming whether or not pressing is also sensed upon the sensing of an object with the capacitance-type sensor 10, when the object sensed with the capacitance-type sensor 10 is another object (e.g., a PET bottle or a hand-held bag) rather than the operating body OB, the possibility of misidentifying the object as the operating body OB is more stably reduced. The detection surface in this case is equal to the region in which the capacitance sensing surface and the pressure-sensitive surface overlap.

Figure 9:
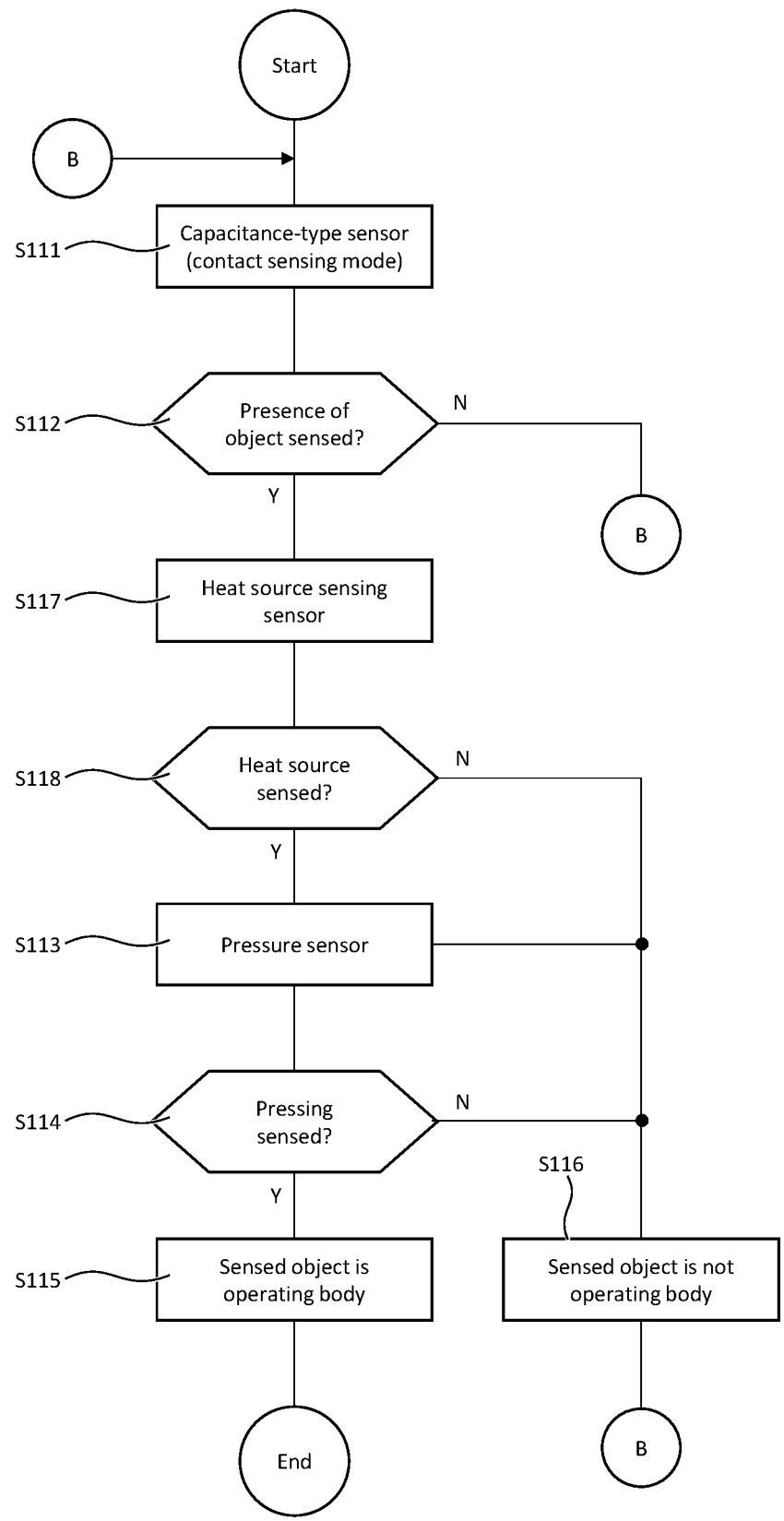
FIG. 9 is a flowchart illustrating still another example of the contact sensing process executed by the operating body detection device of FIG. 1.

FIG. 9 is a flowchart illustrating still another example of the contact sensing process (detection method) executed by the operating body detection device of FIG. 1. In the contact sensing process according to FIG. 8, a heat source is sensed after the pressing is sensed, but as illustrated in FIG. 9, a heat source may be detected before the pressing is sensed.

Figure 10:
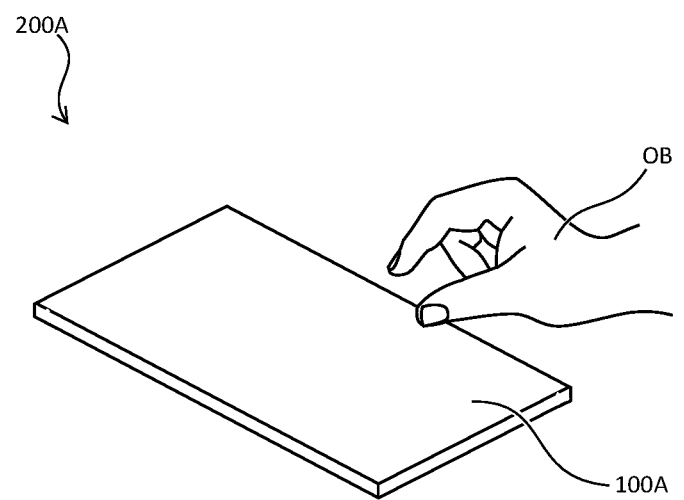
FIG. 10 is a diagram conceptually illustrating an operating body detection device according to a second embodiment of the present invention.
Figure 10:
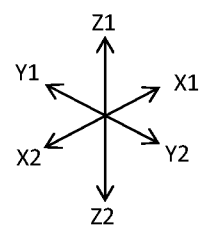
Figure 11:
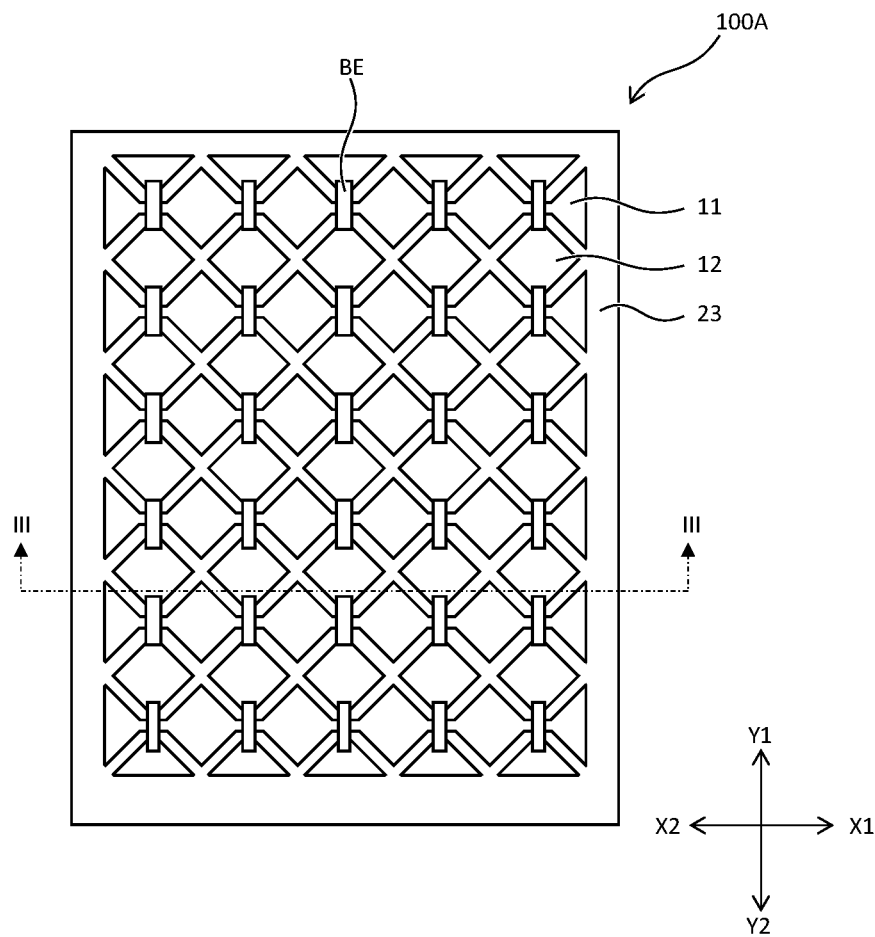
FIG. 11(a) is a plan view conceptually illustrating a laminated structure included in the operating body detection device of FIG. 10.
FIG. 11(b) is a cross-sectional view taken along the section line III-III of FIG. 11(a).
Figure 11:
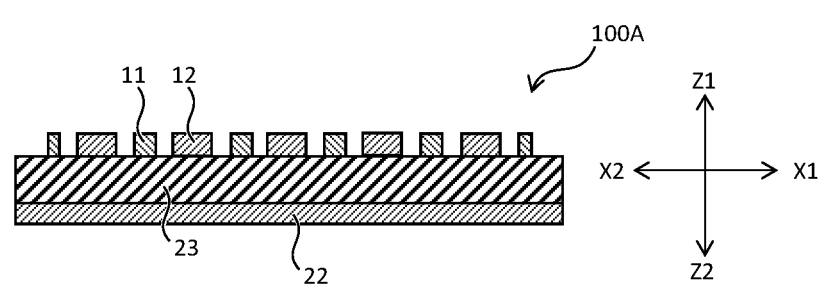
Figure 12:
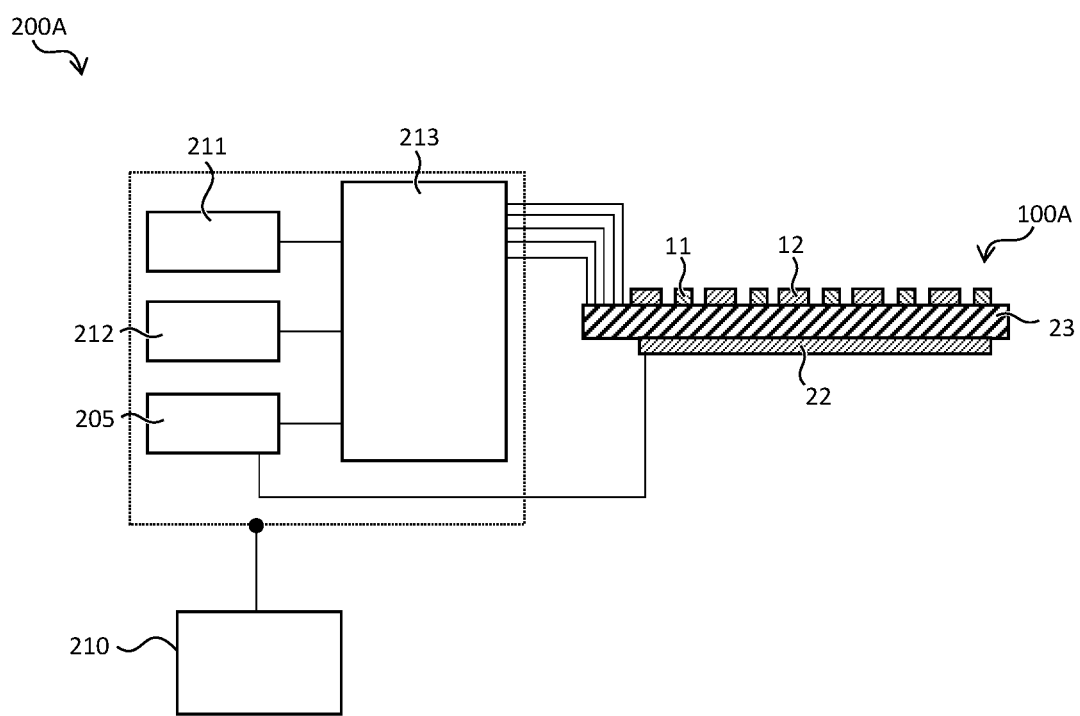
FIG. 12 is a block diagram illustrating the configuration of the operating body detection device of FIG. 10.

FIG. 10 is a diagram conceptually illustrating an operating body detection device according to a second embodiment of the present invention. FIG. 11(a) is a plan view conceptually illustrating a laminated structure included in the operating body detection device of FIG. 10. FIG. 11(b) is a cross-sectional view taken along the section line III-III of FIG. 11(a). FIG. 12 is a block diagram illustrating the configuration of the operating body detection device of FIG. 10.

An operating body detection device 200A illustrated in FIG. 10 includes a laminated structure 100A having the functions of the capacitance-type sensor 10 and pressure sensor 20 of the operating body detection device 200. As illustrated in FIG. 11, the laminated structure 100A has a structure similar to that of the capacitance-type sensor 10 of the operating body detection device 200, but the first electrodes 11 and the second electrodes 12 are formed on one surface (Z1 side in the Z1-Z2 direction) of the piezoelectric membrane 23 as substitute for the substrate 13. The second transparent conductive membrane 22 is provided on the opposite surface (Z2 side in the Z1-Z2 direction) to the surface of the piezoelectric membrane 23 on which the first electrodes 11 and the second electrodes 12 are formed. That is, from the functionality, the first electrodes 11 and the second electrodes 12 function as the first transparent conductive membrane of the pressure sensor 20 of the operating body detection device 200.

As illustrated in FIG. 12, a part of the wirings from the pressure sensor circuit 205 is connected to the multiplexer 213, and another part of the wirings from the pressure sensor circuit 205 is connected to the second transparent conductive membrane 22.

Figure 13:
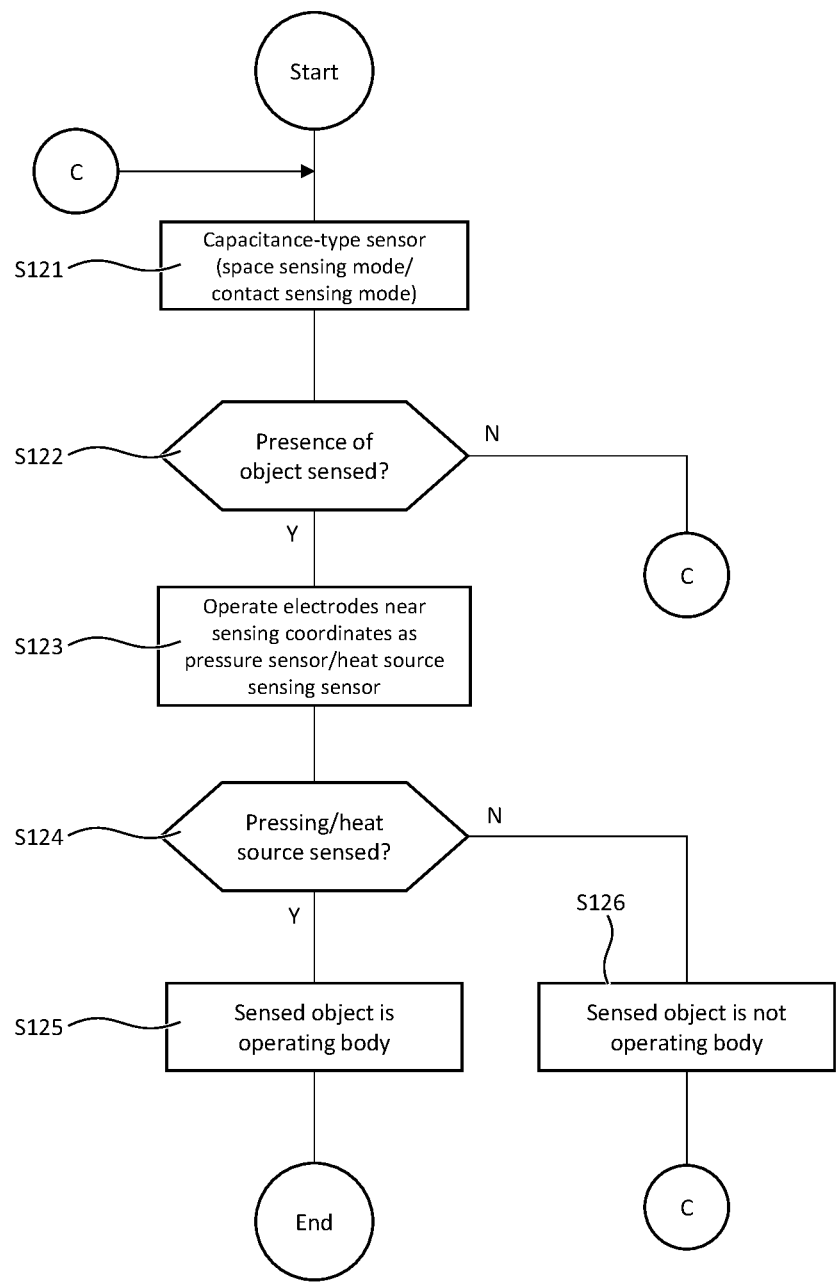
FIG. 13 is a flowchart illustrating a sensing process executed by the operating body detection device of FIG. 10.

FIG. 13 is a flowchart illustrating a sensing process (detection method) executed by the operating body detection device of FIG. 10. In the sensing process executed by the operating body detection device 200A, first, the first electrodes 11 and second electrodes 12 of the laminated structure 100A are made to function as a capacitance-type sensor, which is operated in the space sensing mode or the contact sensing mode (step S121). It is confirmed whether or not the presence of an object is sensed (step S122), and when it is not sensed, the capacitance-type sensor is continuously operated in the space sensing mode or the contact sensing mode.

When the presence of an object is sensed in step S122, data of the coordinates (sensing coordinates) at which the presence of the object is sensed is acquired from the capacitance-type sensor. When operated in the space sensing mode, the first electrodes 11 and/or the second electrodes 12 located at the sensing coordinates and in the vicinity of the sensing coordinates are made to function as the first transparent conductive membrane 21 of the pressure sensor 20 as a heat source sensing sensor to start the heat source measurement, while when operated in the contact sensing mode, the first electrodes 11 and/or the second electrodes 12 located at the sensing coordinates and in the vicinity of the sensing coordinates are made to function as the first transparent conductive membrane 21 of the pressure sensor 20 as a sensor for pressure to start the pressure measurement (step S123). In this example, the first electrodes 11 and/or the second electrodes 12 of the capacitance-type sensor 10 and the first transparent conductive membrane 21 of the pressure sensor 20 are made common, and therefore the first electrodes 11 and/or the second electrodes 12 located at the sensing coordinates as such are operated to function as the first transparent conductive membrane 21, but when the capacitance-type sensor 10 and the pressure sensor 20 are separate bodies as illustrated in FIG. 4, the pressure is sensed by using the first transparent conductive membrane 21 and the second transparent conductive membrane 22 which are located at coordinates on the pressure sensor 20 corresponding to the sensing coordinates on the capacitance-type sensor 10.

It is confirmed whether or not the heat source sensing sensor senses a heat source or whether or not the sensor for pressure senses pressing (step S124), and when a heat source or pressing is sensed, a determination is made that the object sensed with the capacitance-type sensor 10 is the operating body OB (step S125). When a heat source or pressing is not detected in step S124, a determination is made that the object sensed with the capacitance-type sensor 10 is not the operating body OB (step S126), and the capacitance-type sensor 10 is operated again in the space sensing mode or the contact sensing mode.

Thus, by using some of the electrodes of the capacitance-type sensor 10 as the first transparent conductive membrane of the pressure sensor 20, the laminated structure 100A having the functions of the capacitance-type sensor 10 and the pressure sensor 20 can be obtained, and the member directly operated by the operating body OB can be made thinner/simplified. Moreover, the volume of the piezoelectric membrane 23 actually used when sensing the pressing or the heat source is smaller than that of the laminated structure 100, and it is therefore expected that the operating body detection device 200A including the laminated structure 100A uses less power. The detection surface in this case is equal to the region in which the capacitance sensing surface and the pressure-sensitive surface overlap.

Figure 14:
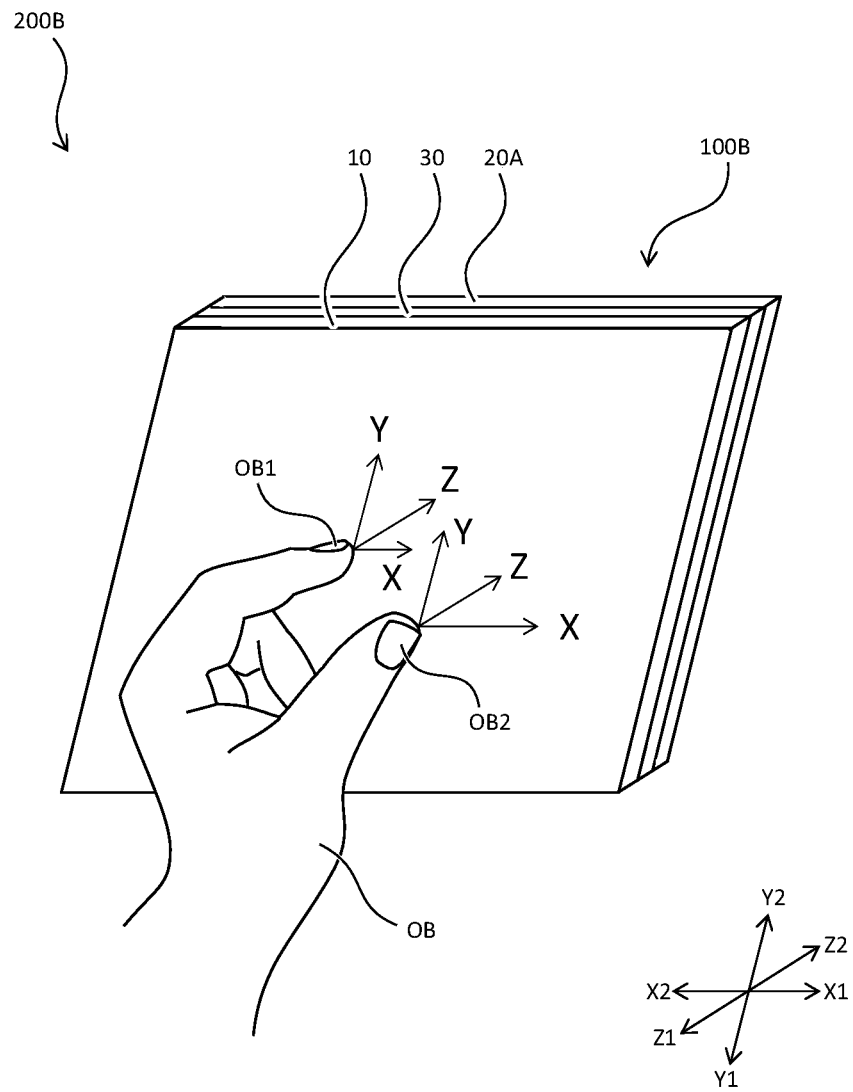
FIG. 14 is a diagram conceptually illustrating an operating body detection device according to a third embodiment of the present invention.
Figure 16:
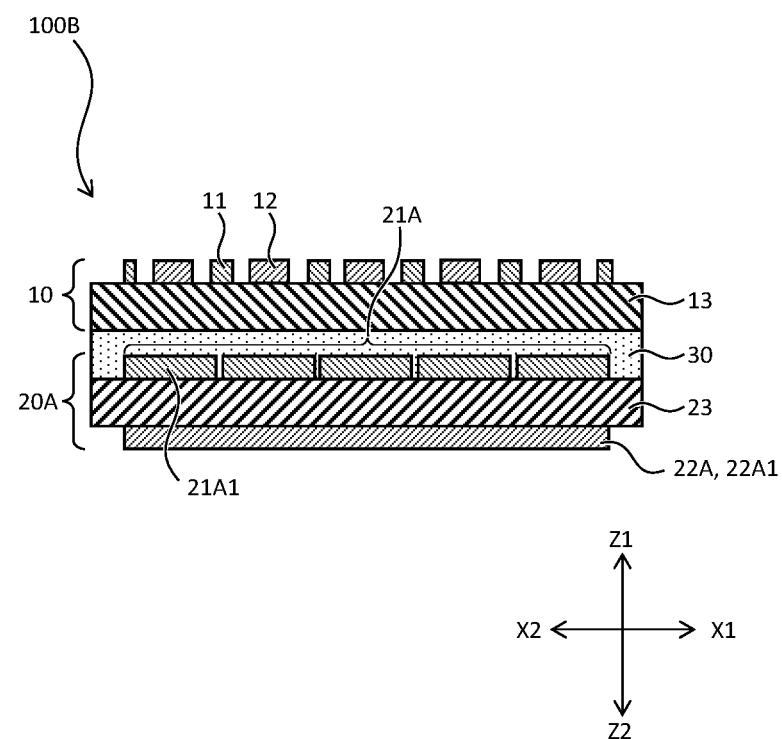
FIG. 16 is a cross-sectional view (X-Z plane) of a laminated structure of the operating body detection device of FIG. 14.
Figure 17:
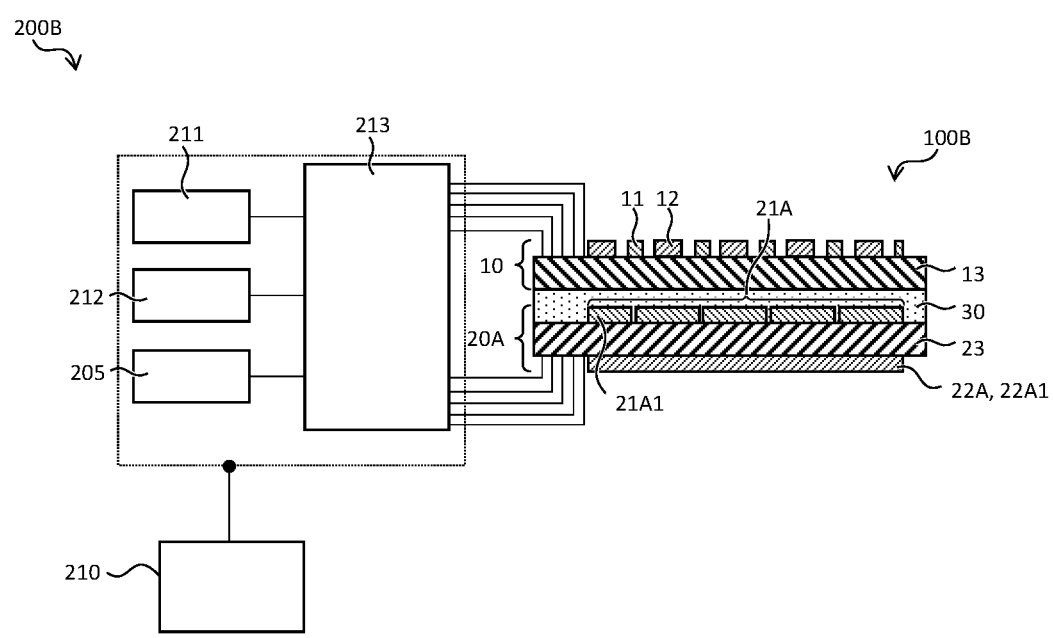
FIG. 17 is a block diagram illustrating the configuration of the operating body detection device of FIG. 14.

FIG. 14 is a diagram conceptually illustrating an operating body detection device according to a third embodiment of the present invention. FIG. 15(a) is a plan view conceptually illustrating a pressure sensor included in the operating body detection device of FIG. 14. FIG. 15(b) is a cross-sectional view taken along the section line IV-IV of FIG. 15(a). FIG. 16 is a cross-sectional view (X-Z plane) of a laminated structure of the operating body detection device of FIG. 14. FIG. 17 is a block diagram illustrating the configuration of the operating body detection device of FIG. 14.

As illustrated in FIG. 14, an operating body detection device 200B according to the third embodiment of the present invention includes a laminated structure 100B configured such that the capacitance-type sensor 10 (see FIG. 2) included in the operating body detection device 200, a transparent joining member 30, and a pressure sensor 20A are laminated in this order from the operating body OB side (Z1 side in the Z1-Z2 direction). The operating body detection device 200B enables operation by a plurality of operating bodies OB1 and OB2 such as a plurality of fingers.

Figure 15:
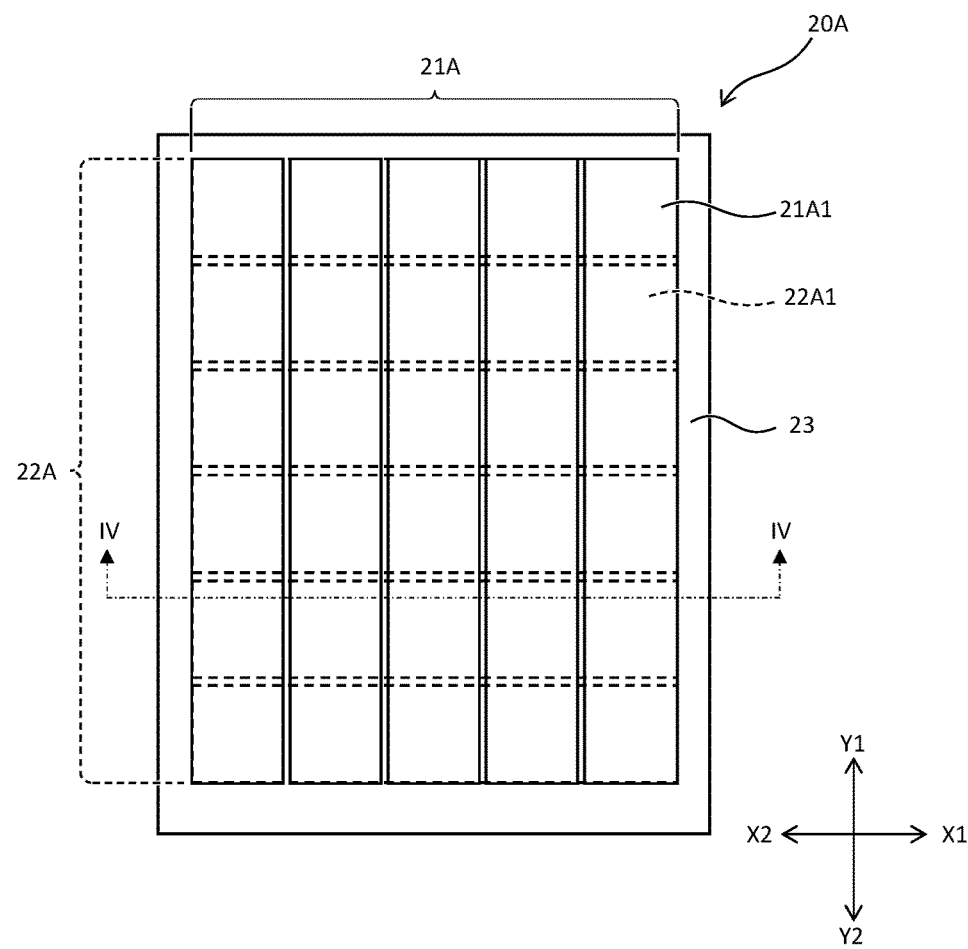
FIG. 15(a) is a plan view conceptually illustrating a pressure sensor included in the operating body detection device of FIG. 14.
FIG. 15(b) is a cross-sectional view taken along the section line IV-IV of FIG. 15(a).
Figure 15:
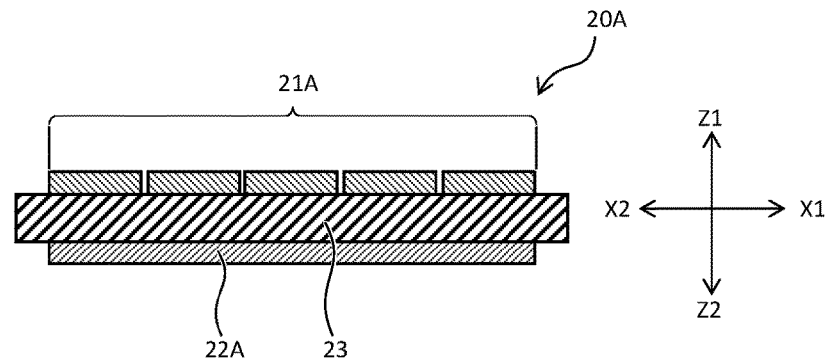

In comparison with the pressure sensor 20 illustrated in FIG. 3, the pressure sensor 20A is configured such that, as illustrated in FIG. 15, each of the first transparent conductive membrane 21 and the second transparent conductive membrane 22 is patterned and divided into a plurality of regions, and divisional measurement is possible. This will be more specifically described. On one surface (Z1 side in the Z1-Z2 direction) of the piezoelectric membrane 23, a plurality of first transparent partial electrodes 21A1 extending in the Y1-Y2 direction is arranged side by side in the X1-X2 direction to constitute a set of first transparent electrodes 21A. On the other surface (Z2 side in the Z1-Z2 direction) of the piezoelectric membrane 23, a plurality of second transparent partial electrodes 22A1 extending in the X1-X2 direction is arranged side by side in the Y1-Y2 direction to constitute a set of second transparent electrodes 22A. When the pressure sensor 20 is viewed from the Z1-Z2 direction, the region in which the piezoelectric membrane 23, the set of first transparent electrodes 21A, and the set of second transparent electrodes 22A overlap is a pressure-sensitive surface. When the pressure sensor 20 is used as a heat source sensing sensor, the above region is a heat source sensing surface.

The first transparent partial electrodes 21A1 extend in the Y1-Y2 direction and the second transparent partial electrodes 22A1 extend in the X1-X2 direction; therefore, when viewed from the Z1-Z2 direction, regions (patterns) in which the electrodes overlap are pressure-sensitive surfaces that are separated individually. Therefore, pressing and/or a heat source can be sensed in a region narrower than the pressure-sensitive surface and/or the heat source sensing surface through selecting one electrode from among the plurality of first transparent partial electrodes 21A1 and selecting one electrode from among the plurality of second transparent partial electrodes 22A1 using the multiplexer 213 and measuring the voltage and/or the current generated in the piezoelectric membrane 23 between the electrodes. Thus, the pressure sensor 20A can individually sense the pressure and/or the heat source at a plurality of positions in the pressure-sensitive surface and/or the heat source sensing surface.

Figure 18:
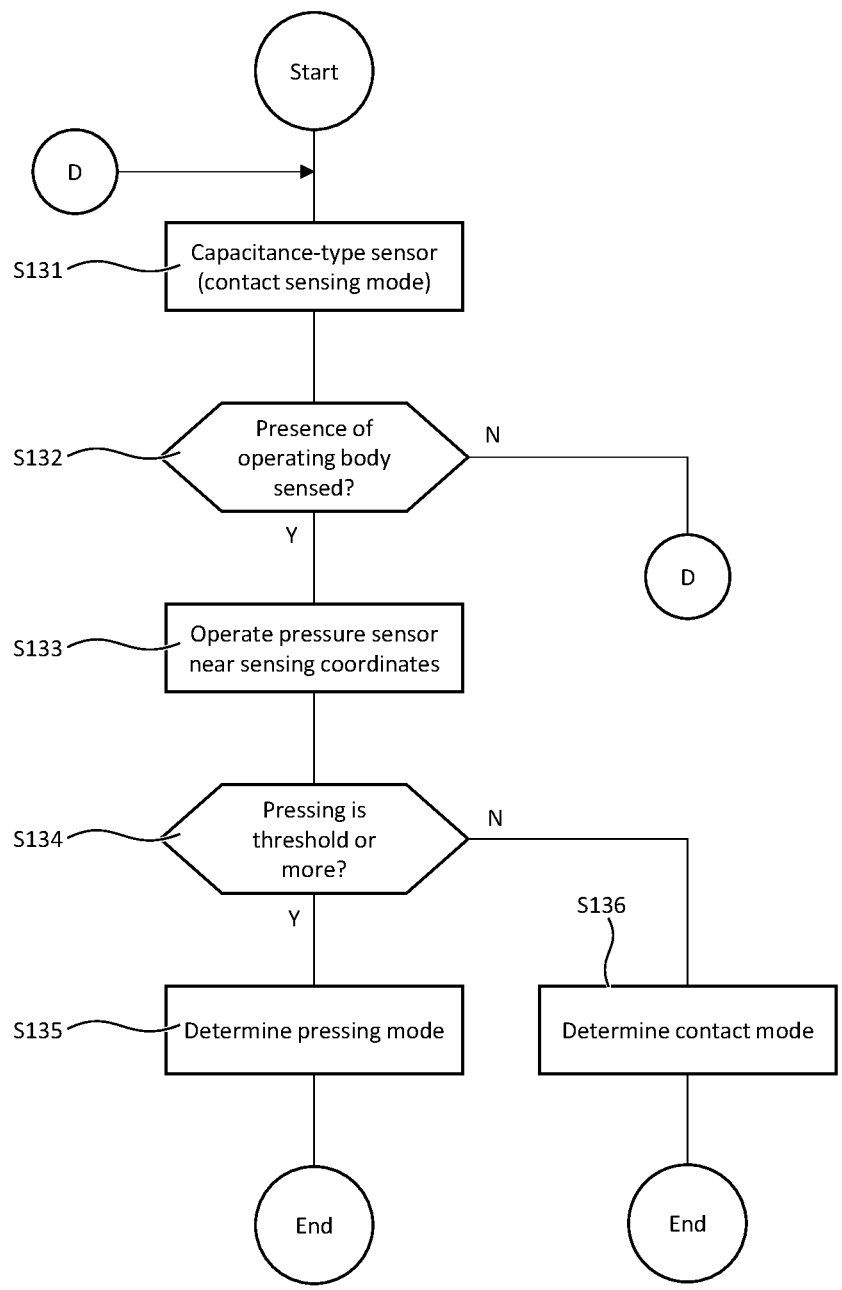
FIG. 18 is a flowchart illustrating a sensing process executed by the operating body detection device of FIG. 14.

FIG. 18 is a flowchart illustrating a sensing process (detection method) executed by the operating body detection device of FIG. 14. In the contact sensing process executed by the operating body detection device 200B, first, the capacitance-type sensor 10 is operated in the contact sensing mode (step S131). It is confirmed whether or not the presence of an object is sensed (step S132), and when it is not sensed, the capacitance-type sensor 10 is continuously operated in the contact sensing mode.

When the presence of an object is sensed, data of the coordinates (sensing coordinates) at which the presence of the object is sensed is acquired from the capacitance-type sensor 10, and electrodes (the first transparent partial electrodes 21A1 and the second transparent partial electrodes 22A1) of the pressure sensor 20A located at the sensing coordinates and in the vicinity of the sensing coordinates are made to function (step S133). Specifically, any of the first transparent partial electrodes 21A1 and any of the second transparent partial electrodes 22A1 are made to function so that the voltage measuring unit 202 is allowed to detect the signal. Here, the voltage measuring unit 202 is configured to be able to measure not only the presence or absence of pressing but also the degree of pressing. Specifically, the voltage measuring unit 202 can measure the voltage generated in the piezoelectric membrane 23 in a stepwise manner (e.g., three steps of large, medium, and small) or in a quantitative manner (i.e., in an analog manner).

It is confirmed whether or not the degree of pressing detected with the pressure sensor 20 at the sensing coordinates is a preliminarily set threshold or more (step S134), and when it is the threshold or more, a determination is made that the operating body OB1 or the operating body OB2 is performing the pressing operation at the measurement portion, and it is determined to perform a pressing mode (step S135). When the degree of pressing is less than the threshold in step S134, a determination is made that the operating body OB1 or the operating body OB2 is performing a contact operation at the measurement portion, and it is determined to perform the contact mode (step S135).

Thus, the two transparent conductive membranes which sandwich the piezoelectric membrane 23 of the pressure sensor 20 are each divided, and it is therefore possible to obtain information on the pressure and/or heat source only from a part of the pattern of the pressure-sensitive surface and/or the heat source sensing surface. Moreover, by making the speed of measuring a part of the pressure-sensitive surface and/or the heat source sensing surface faster than the operation speed of the operating bodies OB1 and OB2, so-called multi-touch is achieved in which the operation input with the plurality of operating bodies OB1 and OB2 is processed. As illustrated in FIG. 15, the size of a pressure sensing region (pattern) that is individually set on the pressure-sensitive surface in the pressure sensor 20A is set to be approximately equal to the size of each diamond-shaped transparent electrode in the capacitance-type sensor 10 illustrated in FIG. 2, but the present invention is not limited to this. The positional information of the operating bodies OB1 and OB2 is obtained by the capacitance-type sensor 10, and therefore the size of a pressure sensing region that is individually set on the pressure-sensitive surface in the pressure sensor 20A may be set larger than the size of each diamond-shaped transparent electrode in the capacitance-type sensor 10. That is, the in-plane resolution of the capacitance change measurement on the capacitance sensing surface of the capacitance-type sensor 10 may be higher than the in-plane resolution of the pressure measurement on the pressure-sensitive surface of the pressure sensor 20A. Moreover, it is also expected that the gain will increase because the portion of the piezoelectric membrane 23 that functions for the pressure measurement and/or the heat source measurement becomes large. The detection surface in this case is equal to the region in which the capacitance sensing surface and the pressure-sensitive surface overlap.

Figure 19:
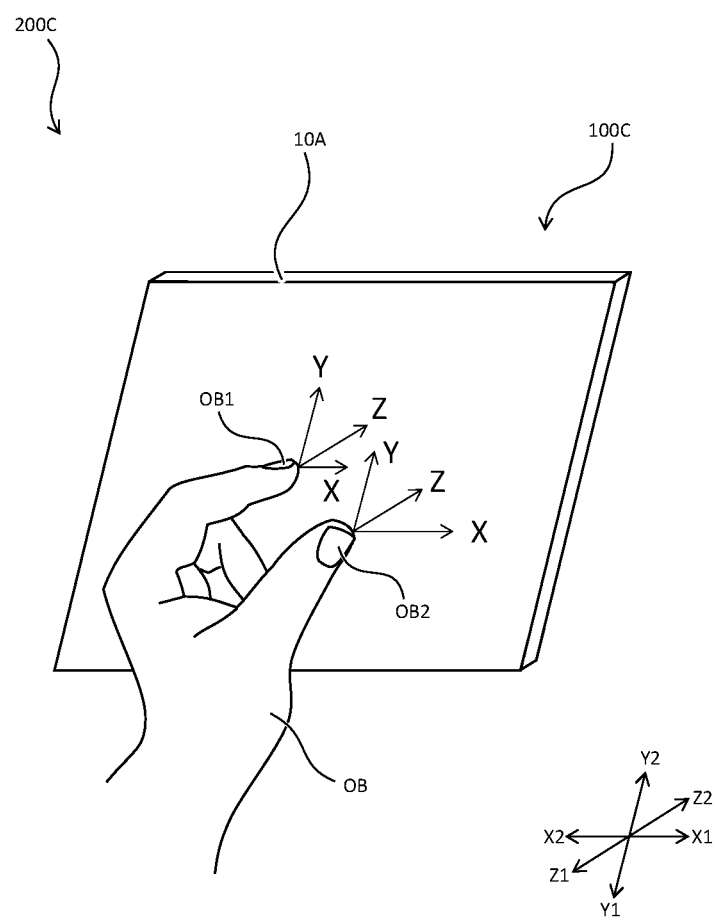
FIG. 19 is a diagram conceptually illustrating an operating body detection device according to a fourth embodiment of the present invention.
Figure 20:
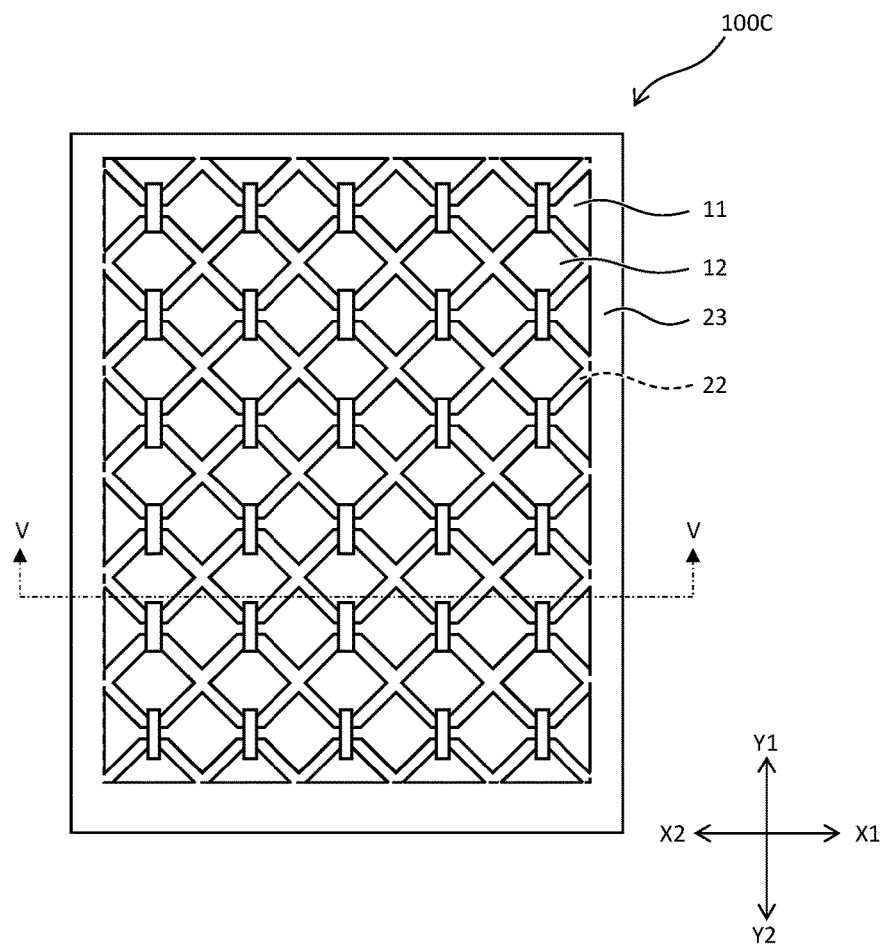
FIG. 20(a) is a plan view conceptually illustrating a laminated structure included in the operating body detection device of FIG. 19.
FIG. 20(b) is a cross-sectional view taken along the section line V-V of FIG. 20(a).
Figure 20:
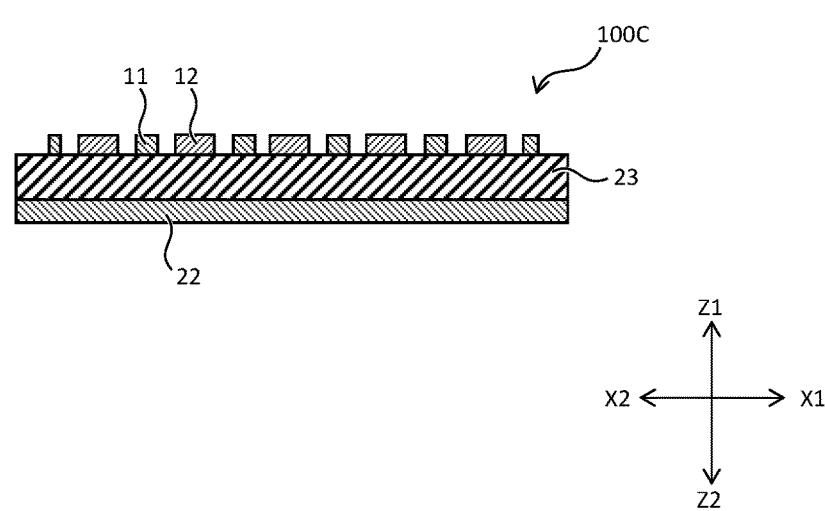
Figure 21:
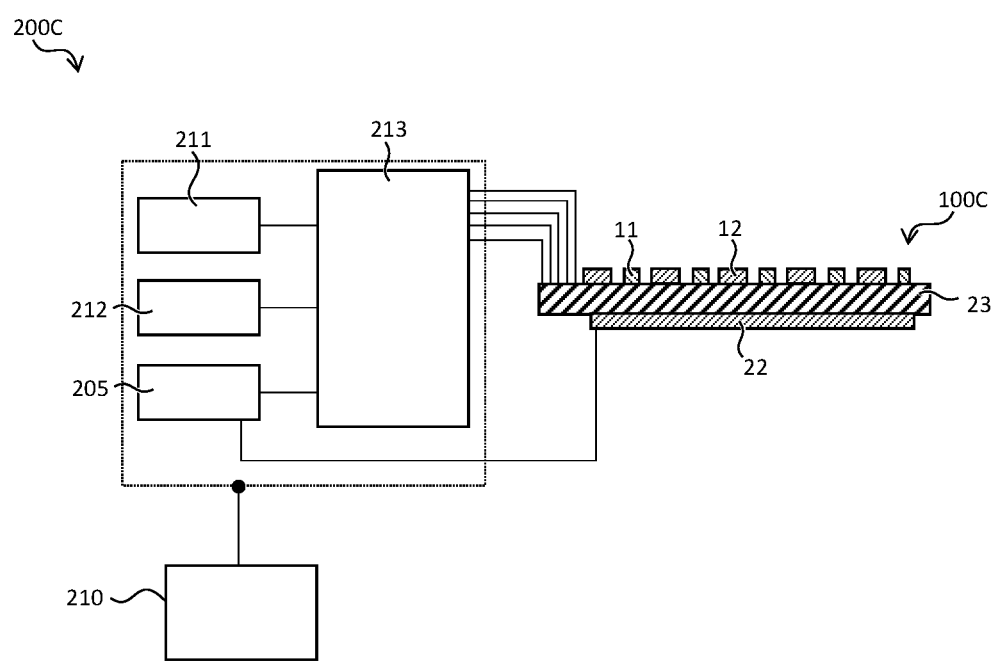
FIG. 21 is a block diagram illustrating the configuration of the operating body detection device of FIG. 19.
Figure 22:
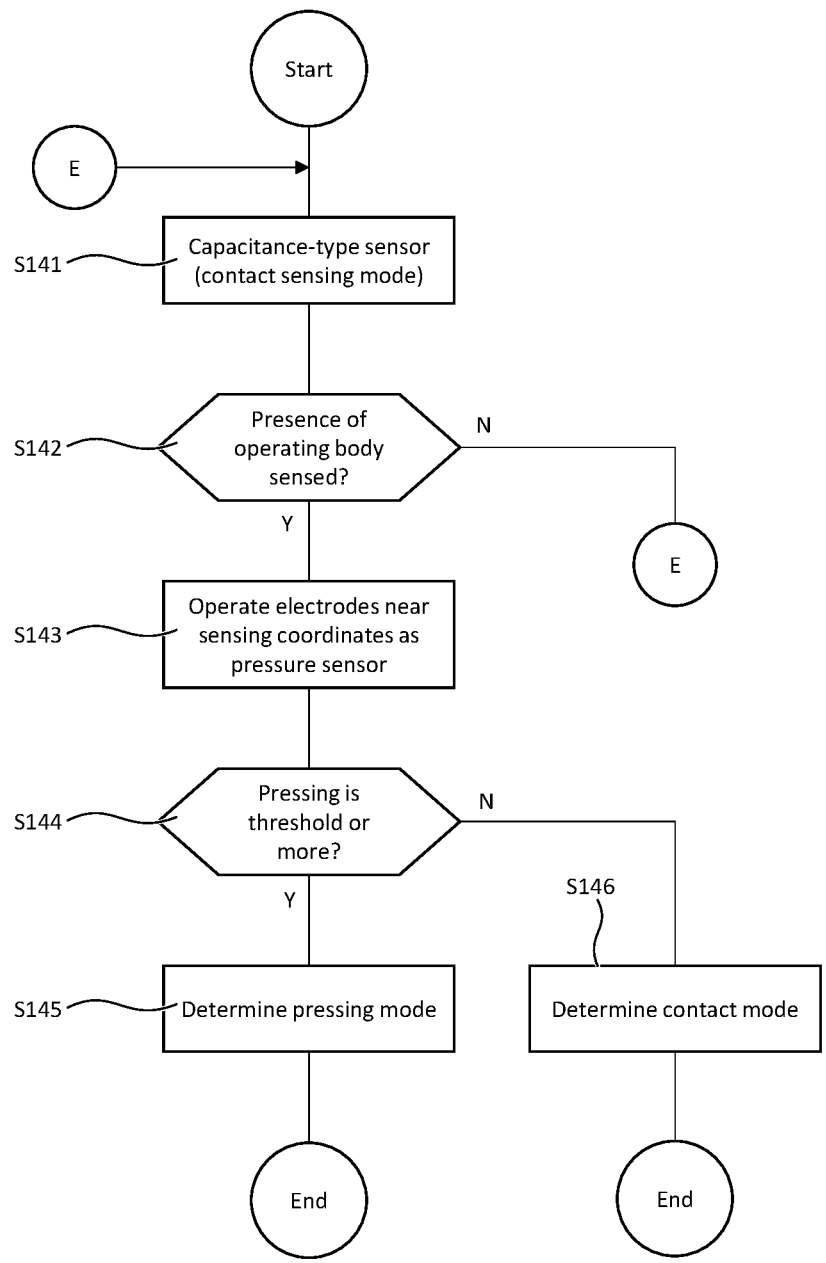
FIG. 22 is a flowchart illustrating a sensing process executed by the operating body detection device of FIG. 19.

FIG. 19 is a diagram conceptually illustrating an operating body detection device according to a fourth embodiment of the present invention. FIG. 20(a) is a plan view conceptually illustrating a laminated structure included in the operating body detection device of FIG. 19. FIG. 20(b) is a cross-sectional view taken along the section line V-V of FIG. 20(a). FIG. 21 is a block diagram illustrating the configuration of the operating body detection device of FIG. 19. FIG. 22 is a flowchart illustrating a sensing process executed by the operating body detection device of FIG. 19.

An operating body detection device 200C illustrated in FIG. 19 includes a laminated structure 100C having the functions of the capacitance-type sensor 10 and pressure sensor 20 of the operating body detection device 200. As illustrated in FIG. 20, the laminated structure 100C has a structure equivalent to that of the laminated structure 100A of the operating body detection device 200A (see FIG. 11). As illustrated in FIG. 21, the block diagram of the operating body detection device 200C is also equal to the block diagram of the operating body detection device 200A (see FIG. 12).

FIG. 22 is a flowchart illustrating a sensing process (detection method) executed by the operating body detection device of FIG. 19. First, the first electrodes 11 and second electrodes 12 of the laminated structure 100C are made to function as a capacitance-type sensor and are operated in the contact sensing mode (step S141). It is confirmed whether or not the presence of an object is sensed (step S142), and when it is not sensed, the capacitance-type sensor is continuously operated in the contact sensing mode.

When the presence of an object is sensed in step S142, data of the coordinates (sensing coordinates) at which the presence of the object is sensed is acquired from the capacitance-type sensor, and the first electrodes 11 and/or the second electrodes 12 located at the sensing coordinates and in the vicinity of the sensing coordinates are made to function as the first transparent conductive membrane 21 of the pressure sensor 20 (step S143). Here, the voltage measuring unit 202 is configured to be able to measure not only the presence or absence of pressing but also the degree of pressing. Specifically, the voltage measuring unit 202 can measure the voltage generated in the piezoelectric membrane 23 in a stepwise manner (e.g., three steps of large, medium, and small) or in a quantitative manner (i.e., in an analog manner).

It is confirmed whether or not the degree of pressing detected with the pressure sensor 20 at the sensing coordinates is a preliminarily set threshold or more (step S144), and when it is the threshold or more, a determination is made that the operating body OB1 or the operating body OB2 is performing the pressing operation at the measurement portion, and it is determined to perform a pressing mode (step S145). When the degree of pressing is less than the threshold in step S144, a determination is made that the operating body OB1 or the operating body OB2 is performing a contact operation at the measurement portion, and it is determined to perform the contact mode (step S145).

Thus, the operating body detection device 200C including the laminated structure 100C, even with a simple structure, achieves a determination as to whether to adopt the pressing mode or the contact mode by multi-touch. The detection surface in this case is equal to the region in which the capacitance sensing surface and the pressure-sensitive surface overlap.

Figure 23:
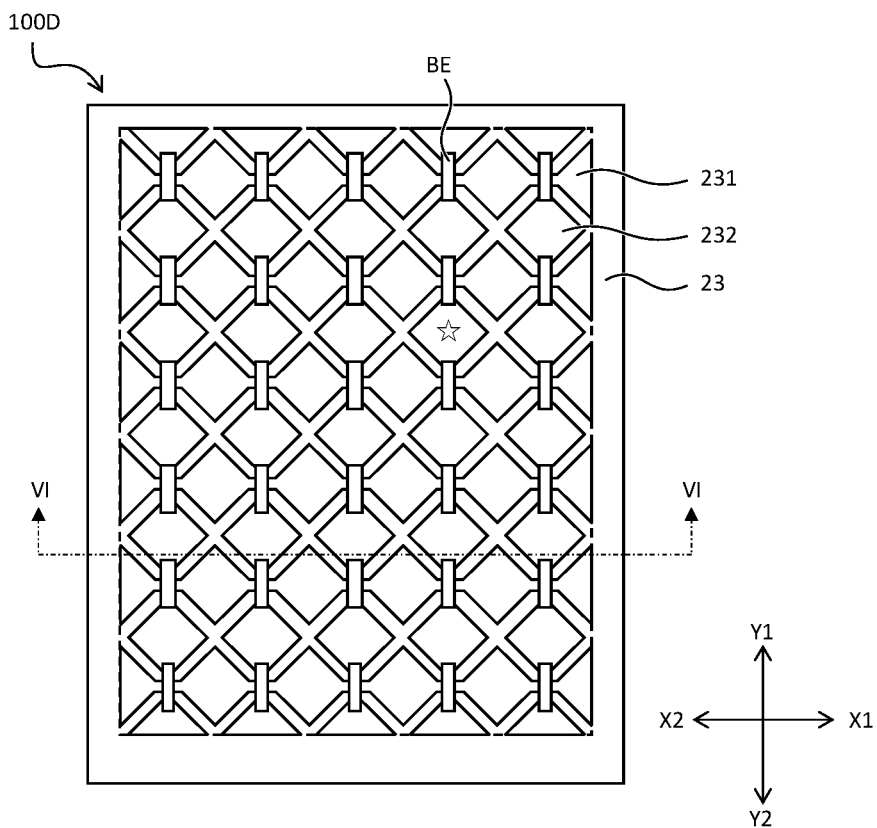
FIG. 23(a) is a plan view conceptually illustrating the configuration of a laminated structure of an operating body detection device according to a fifth embodiment of the present invention when viewed from the Z1 side in the Z1-Z2 direction.
FIG. 23(b) is a plan view conceptually illustrating the configuration of the laminated structure of the operating body detection device according to the fifth embodiment of the present invention when viewed from the Z2 side in the Z1-Z2 direction.
Figure 23:
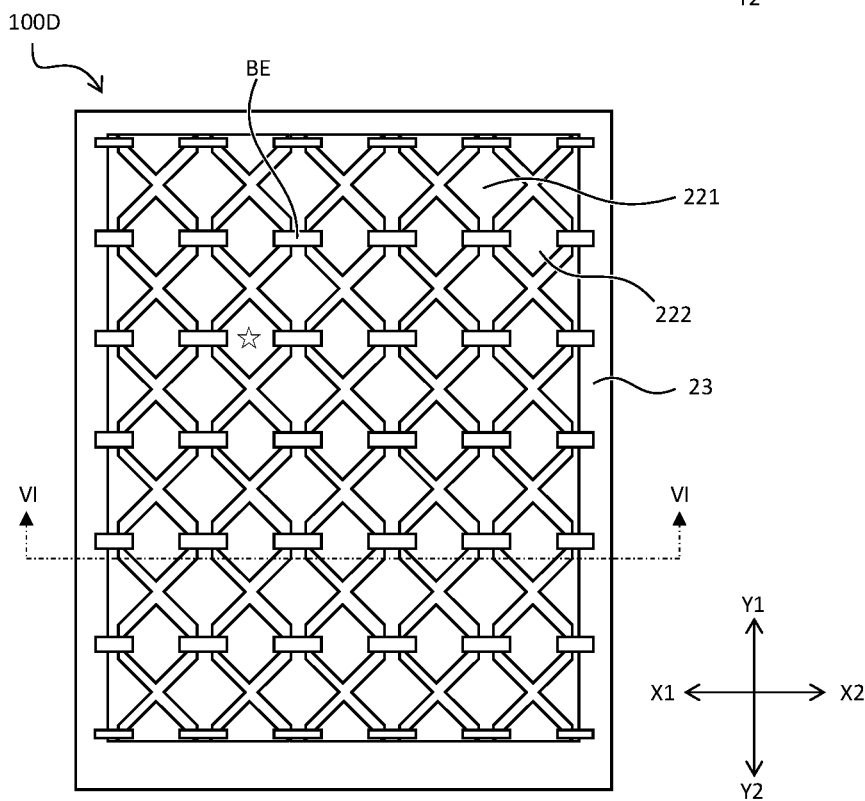
Figure 24:
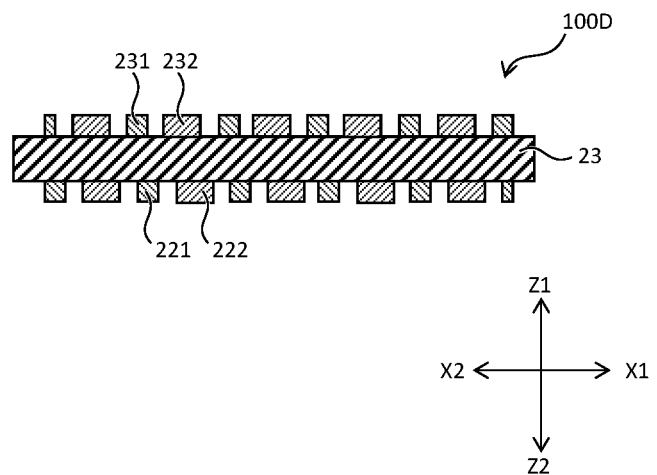
FIG. 24 is a cross-sectional view taken along the section line VI-VI of the laminated structure of the operating body detection device of FIG. 23.
Figure 25:
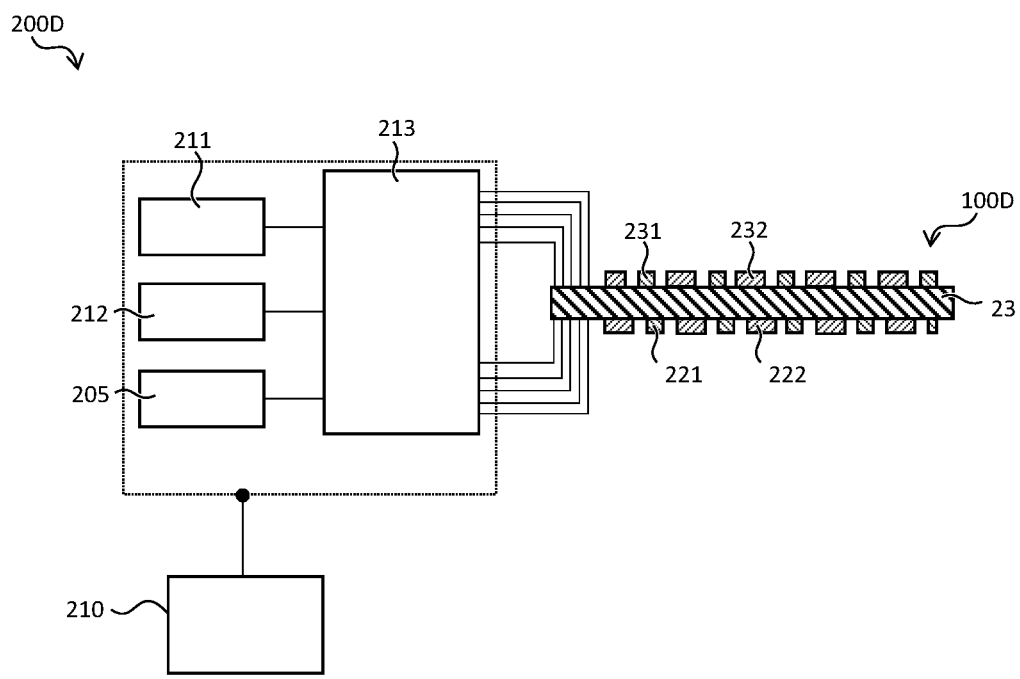
FIG. 25 is a block diagram illustrating the configuration of the operating body detection device of FIG. 23.

FIG. 23(a) is a plan view conceptually illustrating the configuration of a laminated structure of an operating body detection device according to a fifth embodiment of the present invention when viewed from the Z1 side in the Z1-Z2 direction. FIG. 23(b) is a plan view conceptually illustrating the configuration of the laminated structure of the operating body detection device according to the fifth embodiment of the present invention when viewed from the Z2 side in the Z1-Z2 direction. FIG. 24 is a cross-sectional view taken along the section line VI-VI of the laminated structure of the operating body detection device of FIG. 23. FIG. 25 is a block diagram illustrating the configuration of the operating body detection device of FIG. 23.

An operating body detection device 200D according to the fifth embodiment of the present invention has an appearance equivalent to that of the operating body detection device 200C (see FIG. 19) because the portion to be in contact with the operating body OB is composed of one laminated structure 100D.

As illustrated in FIGS. 23 and 24, the operating body detection device 200D is provided with transparent electrodes having similar structures to those of the first electrodes 11 and second electrodes 12 of the capacitance-type sensor 10 on two respective surfaces of the piezoelectric membrane 23 in the thickness direction.

First dual-purpose electrodes 231 and second dual-purpose electrodes 232 provided on the Z1 side in the Z1-Z2 direction of the piezoelectric membrane 23 are similar to the first electrodes 11 and second electrodes 12 of the capacitance-type sensor 10. That is, the first dual-purpose electrodes 231 extend in the X1-X2 direction, and the second dual-purpose electrodes 232 extend in the Y1-Y2 direction.

On the other hand, first one-purpose electrodes 221 and second one-purpose electrodes 222 are different from the first electrodes 11 and second electrodes 12 of the capacitance-type sensor 10 in that bridge wirings BE are provided for electrically connecting the transparent electrodes arranged in the X1-X2 direction. That is, the first one-purpose electrodes 221 extend in the Y1-Y2 direction, and the second one-purpose electrodes 222 extend in the X1-X2 direction.

Accordingly, a part (part indicated by a star in FIG. 23(a)) of the piezoelectric membrane 23 electrically connected to a second dual-purpose electrode 232 extending in the Y1-Y2 direction on the Z1 side in the Z1-Z2 direction is electrically connected to a part (part indicated by a star in FIG. 23(b)) of a second one-purpose electrode 222 extending in the X1-X2 direction on the Z2 side in the Z1-Z2 direction.

When the operating body detection device 200D is used as a capacitance-type sensor, the first dual-purpose electrodes 231 and second dual-purpose electrodes 232 of the laminated structure 100D are used. On the other hand, when the operating body detection device 200D is used as a sensor for pressure or a heat source sensing sensor, the voltage or current generated in the piezoelectric membrane 23 is measured with a combination of any of the first dual-purpose electrodes 231 and any of the first one-purpose electrodes 221 or a combination of any of the second dual-purpose electrodes 232 and any of the second one-purpose electrodes 222.

Figure 26:
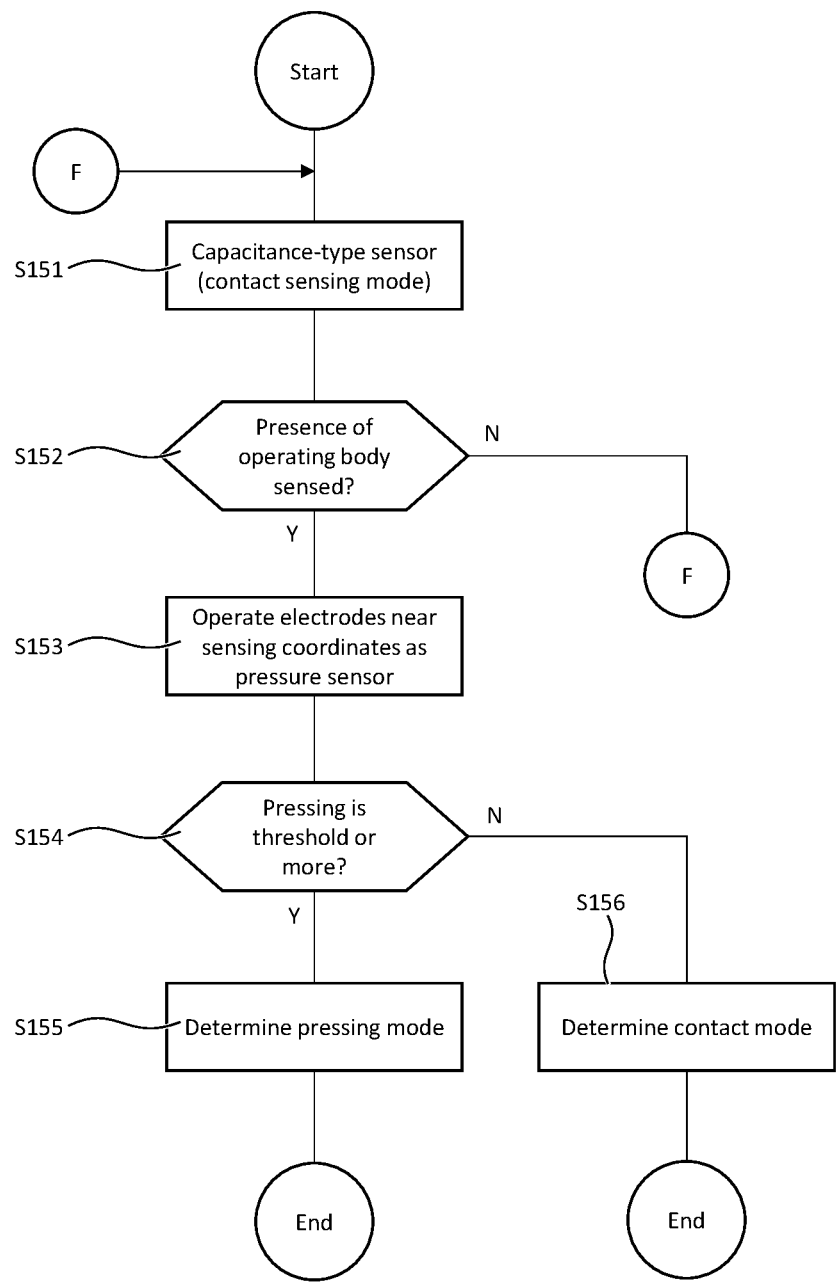
FIG. 26 is a flowchart illustrating a space sensing process executed by the operating body detection device of FIG. 23.

FIG. 26 is a flowchart illustrating a space sensing process (detection method) executed by the operating body detection device of FIG. 23. First, the laminated structure 100D is made to function as a capacitance-type sensor and is operated in the contact sensing mode (step S151). It is confirmed whether or not the presence of an object is sensed (step S152), and when it is not sensed, the capacitance-type sensor is continuously operated in the contact sensing mode.

When the presence of an object is sensed in step S152, data of the coordinates (sensing coordinates) at which the presence of the object is sensed is acquired from the capacitance-type sensor, and the pressure is measured by using combinations of the first dual-purpose electrodes 231 and the first one-purpose electrodes 221 or combinations of the second dual-purpose electrodes 232 and the second one-purpose electrodes 222 located at the sensing coordinates and in the vicinity of the sensing coordinates (step S153). Here, the voltage measuring unit 202 is configured to be able to measure not only the presence or absence of pressing but also the degree of pressing. That is, the sensor for pressure included in the operating body detection device 200D can measure the degree of pressing by the operating body OB with a plurality of gradations. Specifically, the voltage measuring unit 202 can measure the voltage generated in the piezoelectric membrane 23 in a stepwise manner (e.g., three steps of large, medium, and small) or in a quantitative manner (i.e., in an analog manner).

It is confirmed whether or not the degree of pressing detected with the voltage measuring unit 202 at the sensing coordinates is a preliminarily set threshold or more (step S154), and when it is the threshold or more, a determination is made that the operating body OB1 or the operating body OB2 is performing the pressing operation at the measurement portion, and it is determined to perform a pressing mode (step S155). When the degree of pressing is less than the threshold in step S154, a determination is made that the operating body OB1 or the operating body OB2 is performing a contact operation at the measurement portion, and it is determined to perform the contact mode (step S155).

Thus, the operating body detection device 200D including the laminated structure 100D, even with a simple structure in that the number of laminates is small, achieves a determination as to whether to adopt the pressing mode or the contact mode with a high degree of accuracy by multi-touch. The detection surface in this case is equal to the region in which the capacitance sensing surface and the pressure-sensitive surface overlap.

Figure 27:
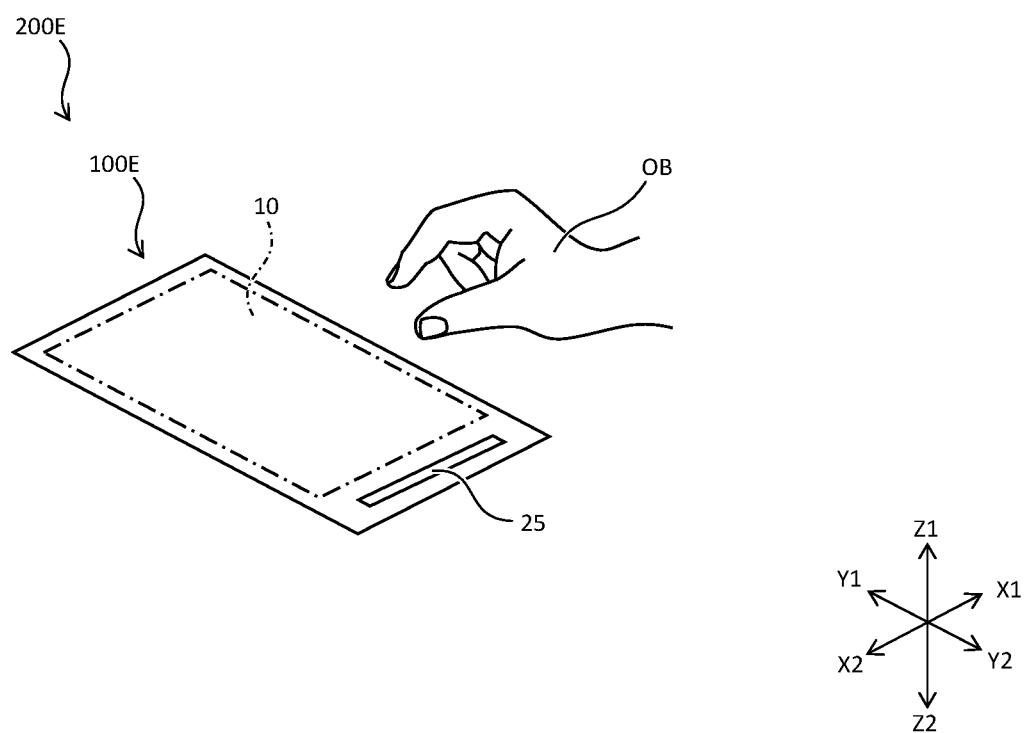
FIG. 27 is a diagram conceptually illustrating an operating body detection device according to a sixth embodiment of the present invention.

FIG. 27 is a diagram conceptually illustrating an operating body detection device according to a sixth embodiment of the present invention. FIG. 28(a) is a plan view conceptually illustrating a laminated structure included in the operating body detection device of FIG. 27. FIG. 28(b) is a cross-sectional view taken along the section line VII-VII of FIG. 28(a). FIG. 28(c) is a cross-sectional view taken along the section line VIII-VIII of FIG. 28(a).

Figure 28:
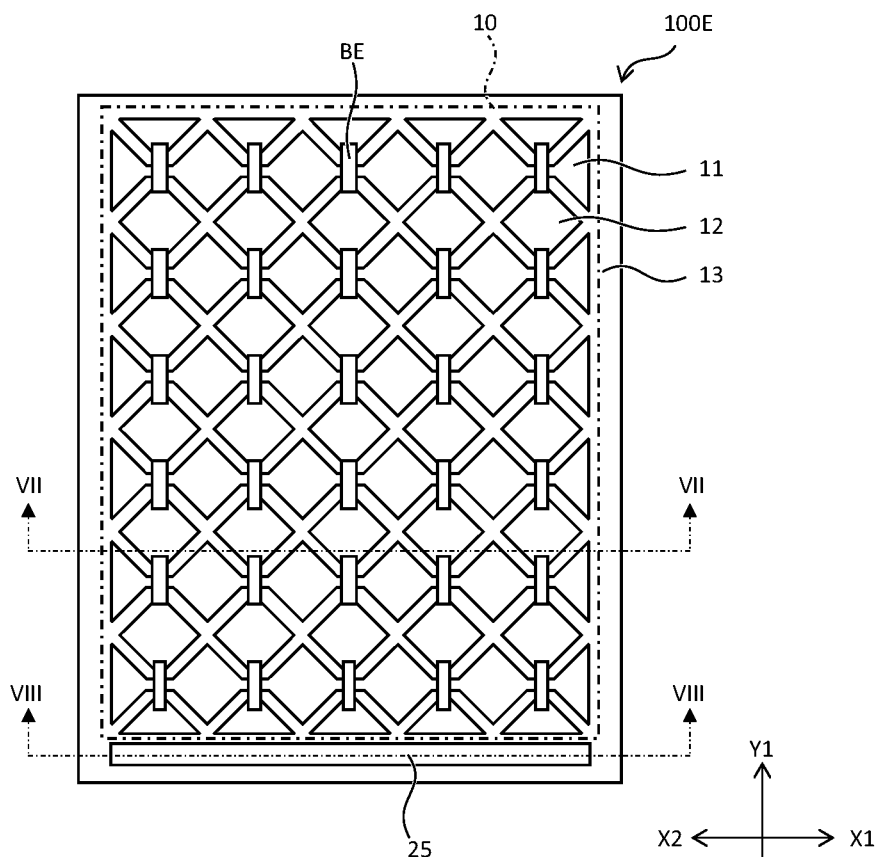
FIG. 28(a) is a plan view conceptually illustrating a laminated structure included in the operating body detection device of FIG. 27.
FIG. 28(b) is a cross-sectional view taken along the section line VII-VII of FIG. 28(a)
FIG. 28(c) is a cross-sectional view taken along the section line VIII-VIII of FIG. 28(a).
Figure 28:
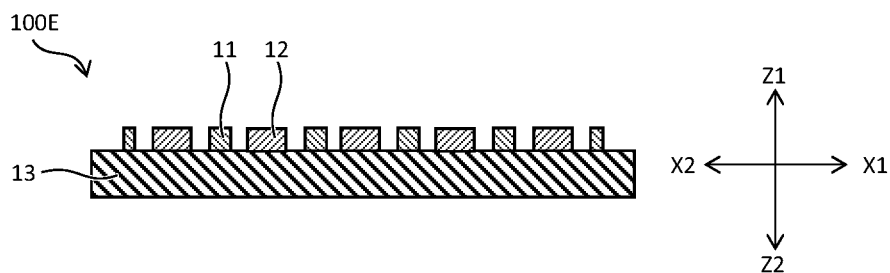
Figure 28:
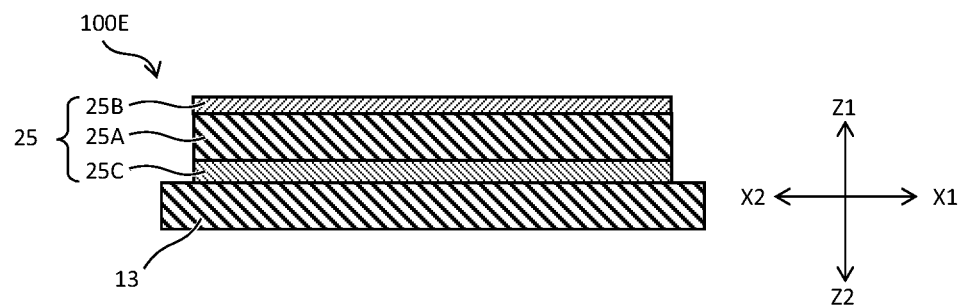

As illustrated in FIGS. 27 and 28, a laminated structure 100E included in an operating body detection device 200E according to the sixth embodiment of the present invention is configured such that a heat source sensing sensor 25 is provided on a part (specifically, a part on the Y2 side in the Y1-Y2 direction) of the outside of the capacitance sensing surface of the capacitance-type sensor 10 included in the laminated structure 100. In the operating body detection device 200E, therefore, the capacitance sensing surface and the heat source sensing surface do not overlap when viewed from the operating body OB side (Z1 side in the Z1-Z2 direction). The heat source sensing sensor 25 includes a piezoelectric membrane 25A and transparent conductive membranes 25B and 25C provided on both sides of the piezoelectric membrane 25A in the thickness direction (Z1-Z2 direction). An operating body sensing process executed by the operating body detection device 200E is the same as that in the flow illustrated in the flowchart of FIG. 6. In the flowchart of FIG. 6, the capacitance-type sensor operates in the space sensing mode in step S101, but in the operating body sensing process executed by the operating body detection device 200E, the capacitance-type sensor may operate in any of the space sensing mode and the contact sensing mode, or both modes may be alternately performed. The detection surface in this case is equal to the capacitance sensing surface.

Figure 29:
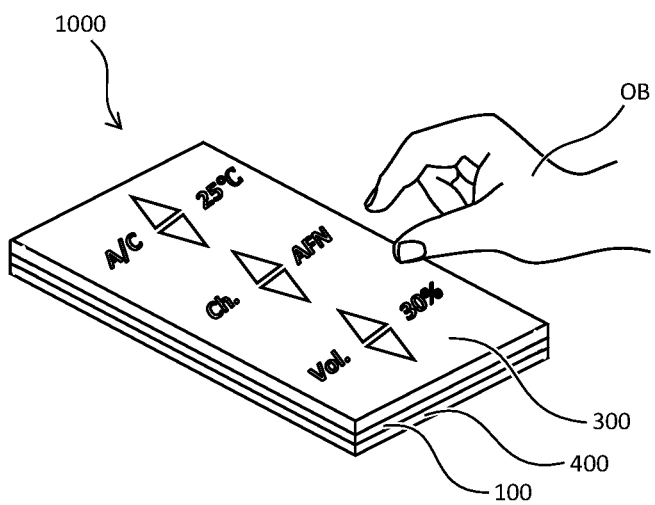
FIG. 29(a) is a diagram conceptually illustrating an input/output device including the operating body detection device according to the first embodiment of the present invention.
FIG. 29(b) is a cross-sectional view conceptually illustrating the configuration of the input/output device of FIG. 29(a).
Figure 29:
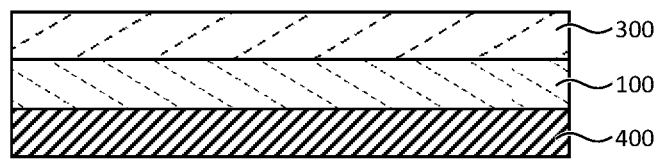

FIG. 29(*a*) is a diagram conceptually illustrating an input/output device including the operating body detection device according to the first embodiment of the present invention. FIG. 29(*b*) is a cross-sectional view conceptually illustrating the configuration of the input/output device of FIG. 29(*a*). As illustrated in FIG. 29, an input/output device 1000 including the operating body detection device 200 according to the first embodiment of the present invention is provided with a cover panel 300 on an operation side of the translucent laminated structure 100 in the operating body detection device 200, that is, on the side on which the operating body OB is located (Z1 side in the Z1-Z2 direction). The cover panel 300 is made of a translucent material, and specific examples of the material include glass and polycarbonate (PC). A display device 400 is provided on the side (Z2 side in the Z1-Z2 direction) opposite to the side (operation side) on which the cover panel 300 of the laminated structure 100 is provided. Specific examples of the display device include an organic EL display device and a liquid crystal display device.

An image or video generated by the display device 400 passes through the laminated structure 100 and the cover panel 300 and is displayed on the operating body OB side (Z1 side in the Z1-Z2 direction) so as to be visually recognizable. When the power of the input/output device 1000 is turned on, the capacitance-type sensor 10 of the operating body detection device 200 operates in the space sensing mode, and when the operating body OB approaches the cover panel 300, the operating body OB is detected in the process illustrated in FIG. 6. Only when this process is carried out and a determination is made that the object sensed with the capacitance-type sensor 10 in the space sensing mode is the operating body OB by the sensing with the heat source sensing sensor, the capacitance-type sensor 10 of the operating body detection device 200 operates in the contact sensing mode, and the contact of the operating body OB with the cover panel 300 is sensed by any of the processes of FIGS. 7 to 9. When the operation input from the operating body OB is sensed, the input/output device 1000 outputs a signal corresponding to the input operation to an external device. Thus, the heat source is measured by the heat source sensing sensor before the operation input from the operating body OB is sensed in the contact sensing mode; therefore, even when a part of a hand-held bag approaches the cover panel 300, for example, as substitute for the operating body OB, the capacitance-type sensor 10 does not start the contact sensing mode.

When the operating body OB touches a predetermined position of the cover panel 300 based on the image displayed on the cover panel 300, the capacitance-type sensor 10 of the laminated structure 100 senses the contact position of the operating body OB, the pressure sensor 20 of the laminated structure 100 senses the pressing and confirms the operation input made by the operating body OB, and the input/output device 1000 outputs a signal corresponding to the input operation of the operating body OB to an external device.

Figure 30:
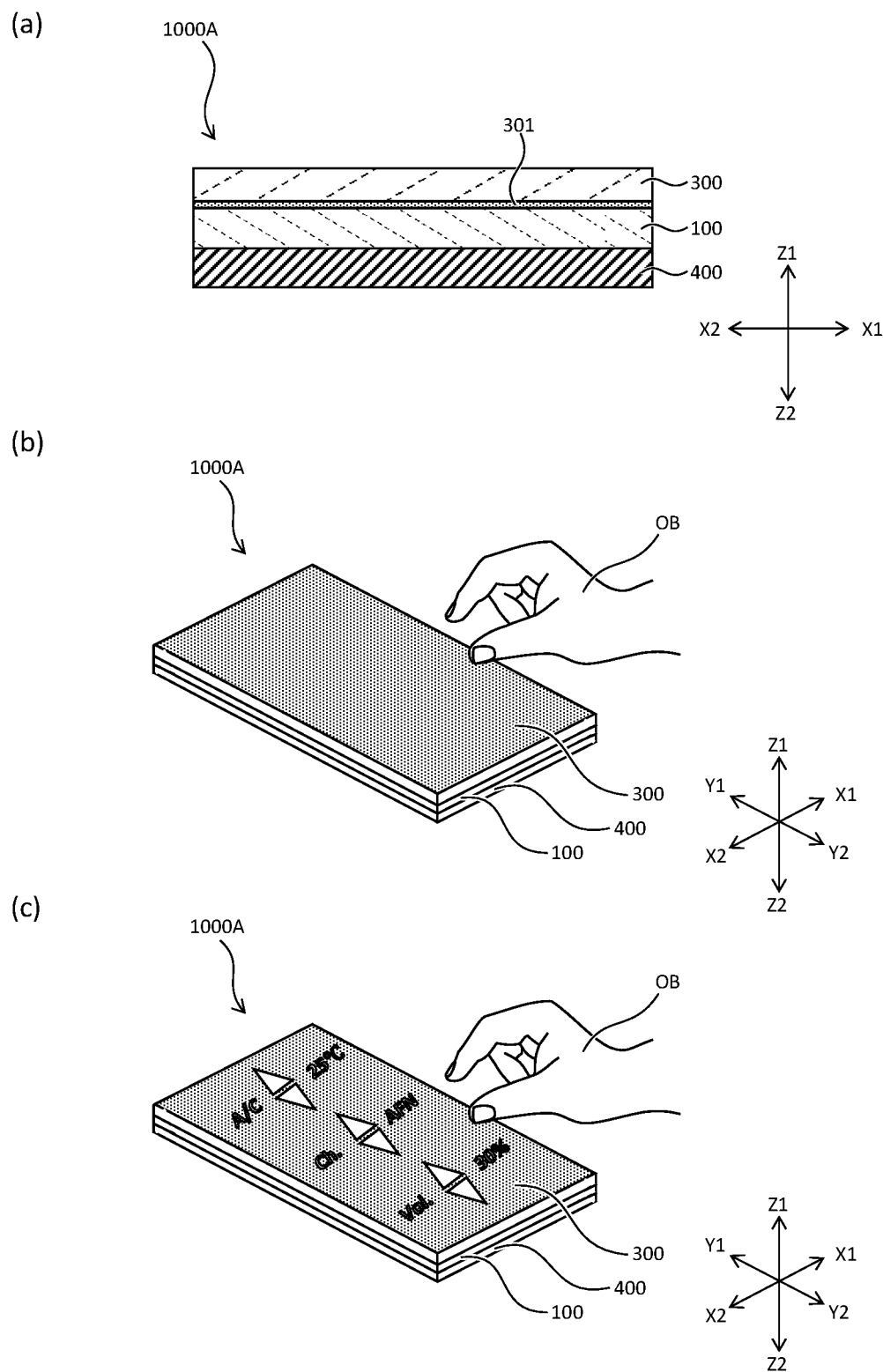
FIG. 30(a) is a cross-sectional view conceptually illustrating the configuration of another example of the input/output device including the operating body detection device according to the first embodiment of the present invention.
FIG. 30(b) is a diagram conceptually illustrating a standby state of the input/output device of FIG. 30(a)
FIG. 30(c) is a diagram conceptually illustrating a state in which the display device of the input/output device of FIG. 30(a) is activated.

FIG. 30(*a*) is a cross-sectional view conceptually illustrating the configuration of another example of the input/output device including the operating body detection device according to the first embodiment of the present invention. FIG. 30(*b*) is a diagram conceptually illustrating a standby state of the input/output device of FIG. 30(*a*). FIG. 30(*c*) is a diagram conceptually illustrating a state in which the display device of the input/output device of FIG. 30(*a*) is activated.

In comparison with the input/output device 1000 illustrated in FIG. 29, an input/output device 1000A illustrated in FIG. 30 is different from the input/output device 1000 in that the input/output device 1000A has a decorative layer 301 between the cover panel 300 and the laminated structure 100, that is, on the cover panel 300 side (Z1 side in the Z1-Z2 direction) of the laminated structure 100. The decorative layer 301 has a light transmittance to such an extent that the decorative layer 301 transmits the image light from the display device 400, but even when the cover panel 300 side is irradiated with external light, the lower side (Z2 side in the Z1-Z2 direction) of the decorative layer 301 cannot be visually recognized. In the standby state of the input/output device 1000, the image from the display device 400 is not displayed, and therefore only the design of the decorative layer 301 on the cover panel 300 side (Z1 side in the Z1-Z2 direction) is visually recognized by the operator.

In this standby state, the capacitance-type sensor 10 of the operating body detection device 200 is operating in the space sensing mode, and when the operating body OB approaches the cover panel 300, the operating body OB is detected in the process illustrated in FIG. 6. Then, when a predetermined image is displayed by the display device 400 triggered with the detection of the operating body OB, the operating body OB side is irradiated with the image light from the display device 400 beyond the decorative layer 301, and the operator visually recognizes the image from the display device 400. In this state, the capacitance-type sensor 10 of the operating body detection device 200 operates in the contact sensing mode, and the contact of the operating body OB with the cover panel 300 is sensed in any of the processes of FIGS. 7 to 9. When the operation input from the operating body OB is sensed, the input/output device 1000A outputs a signal corresponding to the input operation to an external device.

One or more embodiments have been described above, but the present invention is not limited to these examples. For example, the scope of the present invention also encompasses those in which a person skilled in the art appropriately makes addition, deletion, or design changes of one or more features to each of the previously described embodiments or those in which features of the configuration examples of each embodiment are combined as appropriate, provided that the gist of the present invention is included. For example, in the above description, the first transparent conductive membrane 21 and the second transparent conductive membrane 22 used when the pressure sensor 20 including the piezoelectric membrane 23 is made to function as a sensor for pressure are used as electrodes also when the pressure sensor 20 is used as a heat source sensing sensor, but the present invention is not limited to this. When the pressure sensor 20 is used as a heat source sensing sensor, electrodes different from the first transparent conductive membrane 21 and the second transparent conductive membrane 22 may be used to measure a heat source. As a specific example, a plurality of electrodes may be separately provided on the side surface of the piezoelectric membrane 23, and the current generated in the piezoelectric membrane 23 may be measured with these electrodes. The pressure sensor 20 may be capable of measuring the degree of pressing by the operating body OB with a plurality of gradations.

Figure 31:
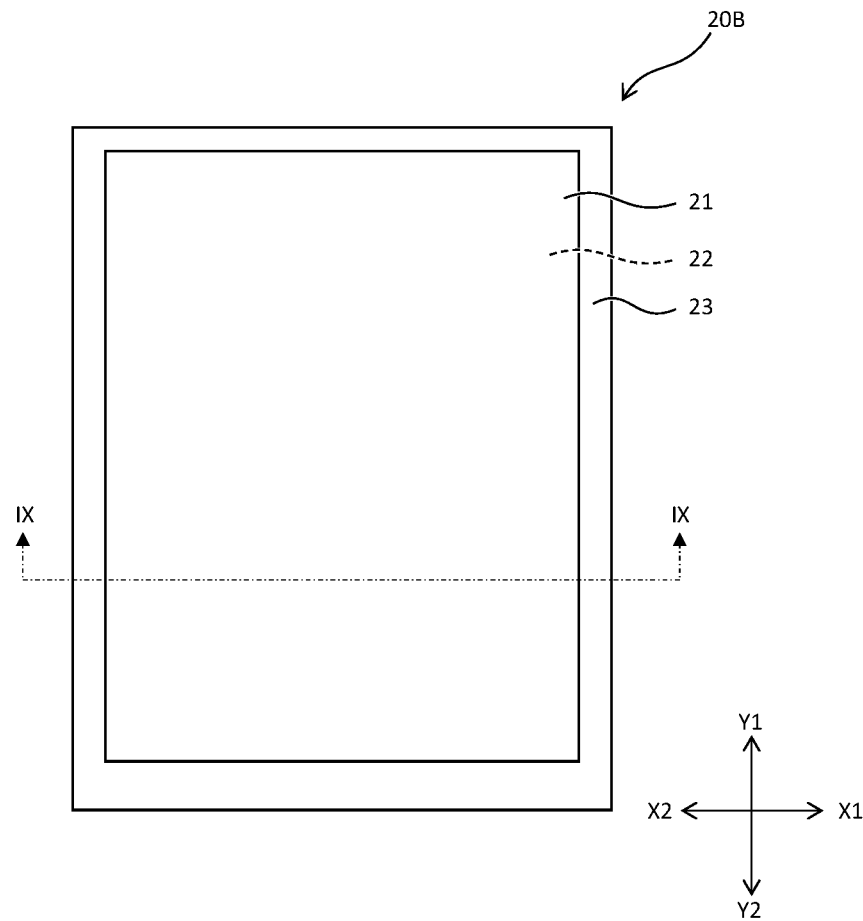
FIG. 31(a) is a plan view conceptually illustrating the structure of a pressure sensor included in an operating body detection device according to a modified example of the present invention.
FIG. 31(b) is a cross-sectional view taken along the section line IX-IX of FIG. 31(a).
Figure 31:
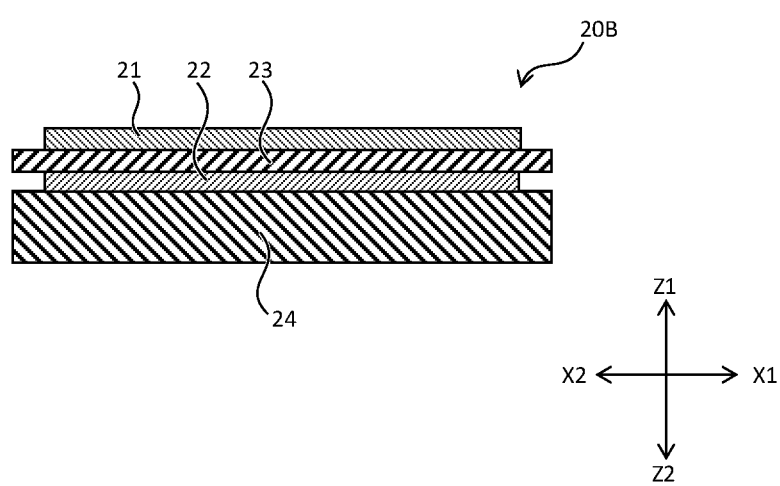

In the above description, the piezoelectric membrane 23 functions also as a support for supporting the first transparent conductive membrane 21 and the second transparent conductive membrane 22, but the present invention is not limited to this. As in a pressure sensor 20B illustrated in FIG. 31, a laminate in which the piezoelectric membrane 23 is laminated together with the first transparent conductive membrane 21 and the second transparent conductive membrane 22 may be supported by a separately prepared support 24. Such a structure is obtained by providing a thin film constituting the piezoelectric membrane 23 and the first transparent conductive membrane 21 and the second transparent conductive membrane 22 on at least one surface of the support 24.

Figure 32:
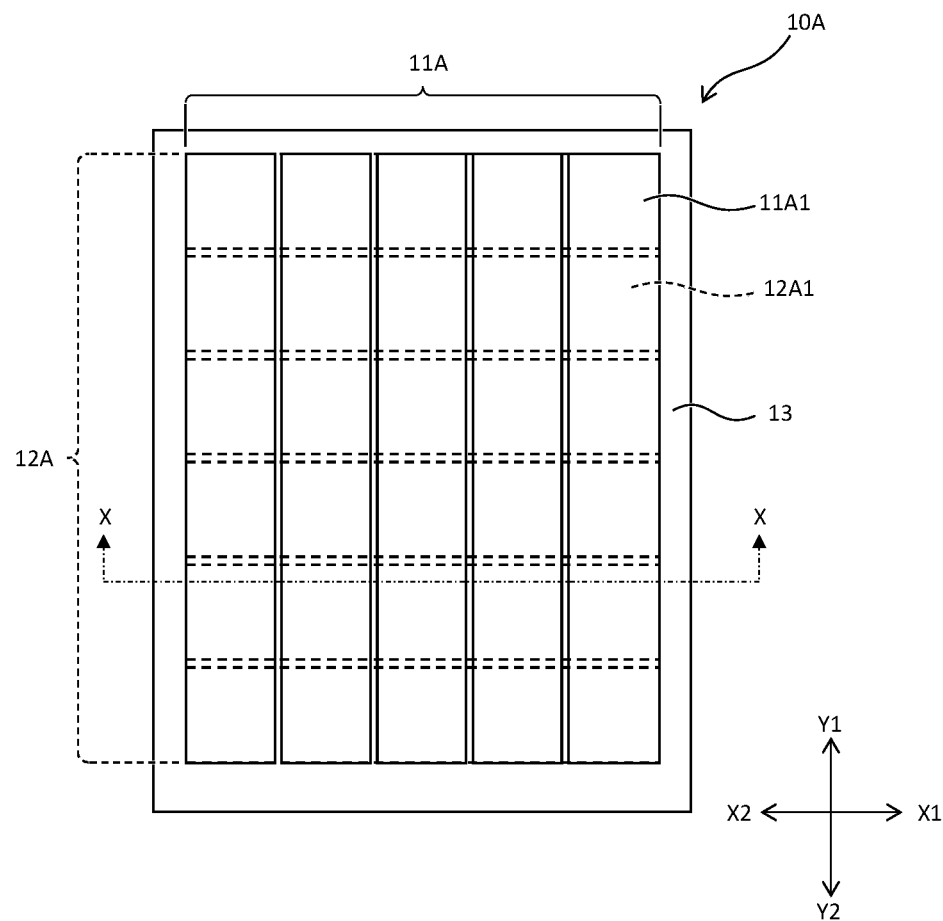
FIG. 32(a) is a plan view conceptually illustrating the structure of a capacitance-type sensor of self-capacitance type included in an operating body detection device according to a modified example of the present invention.
FIG. 32(b) is a cross-sectional view taken along the section line X-X of FIG. 32(a).
Figure 32:
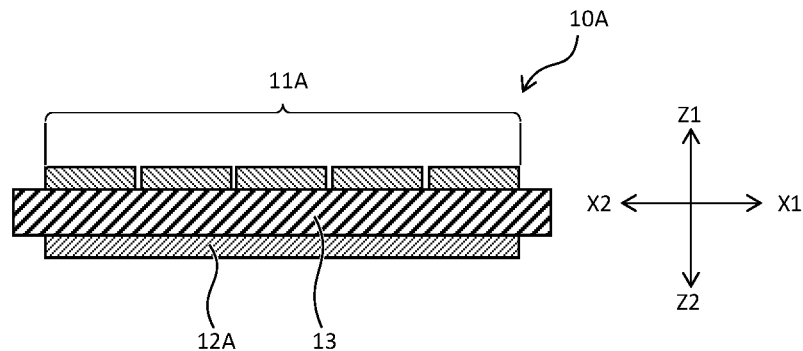

In the above description, the capacitance-type sensor 10 is a mutual capacitance type, but may also be a self-capacitance type. FIG. 32 is a diagram illustrating a configuration when the capacitance-type sensor is a self-capacitance type. As illustrated in FIG. 32, in a capacitance-type sensor 10A of the self-capacitance type, a set of first electrodes 11A configured such that a plurality of first partial electrodes 11A1 extending in the Y1-Y2 direction is arranged side by side in the X1-X2 direction is provided on one side (Z1 side in the Z1-Z2 direction) of the substrate 13, and a set of second electrodes 12A configured such that a plurality of second partial electrodes 12A1 extending in the X1-X2 direction is arranged side by side in the Y1-Y2 direction is provided on the other side (Z2 side in the Z1-Z2 direction) of the substrate 13. That is, in this configuration, the substrate 13 is located between the set of first electrodes 11A and the set of second electrodes 12A. In general, the capacitance-type sensor 10A of the self-capacitance type is likely to be affected by water droplets, but according to the operating body detection device of each embodiment, it is possible to easily identify whether the capacitance changes due to water droplets attaching or the capacitance changes due to the operating body OB contacting.

Figure 33:
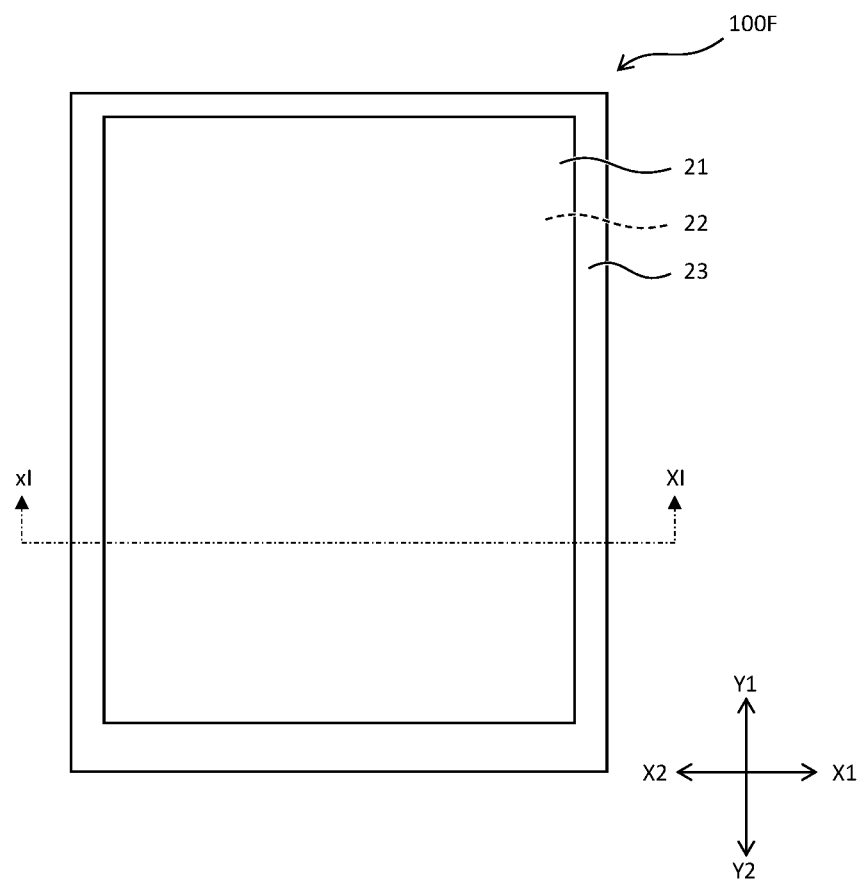
FIG. 33(a) is a plan view conceptually illustrating the structure of a laminated structure included in an operating body detection device according to another aspect of the present invention.
FIG. 33(b) is a cross-sectional view taken along the section line XI-XI of FIG. 33(a)
FIG. 33(c) is a block diagram illustrating the configuration of the detection device according to another aspect of the present invention.
Figure 33:
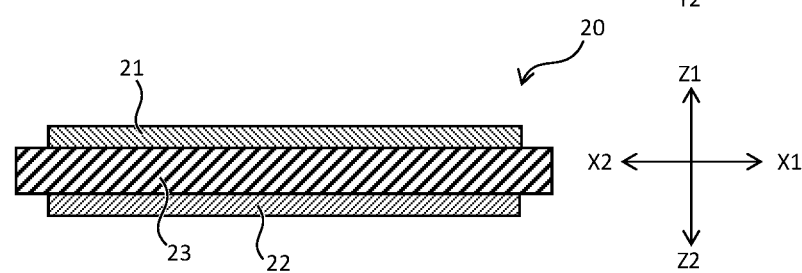
Figure 33:
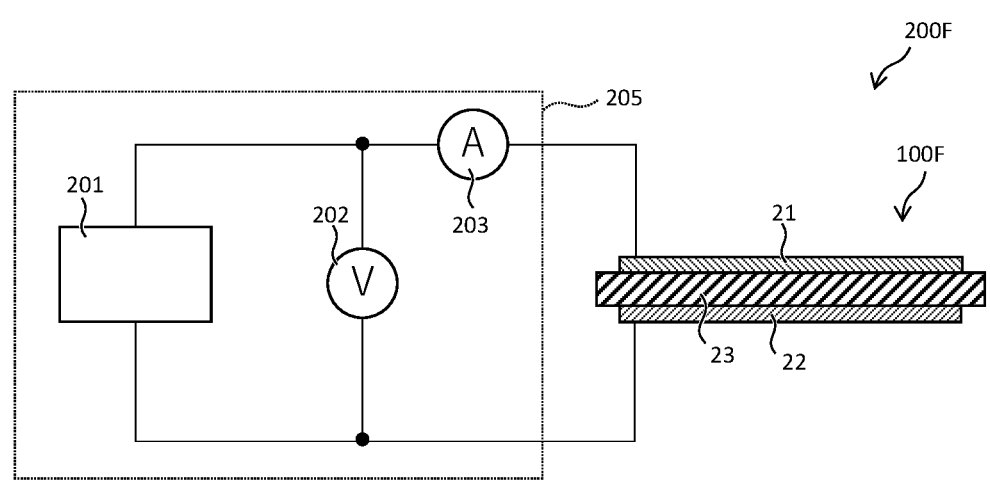

The present invention provides an operating body detection device including a laminated structure having a pressure sensing film that has a piezoelectric membrane having a pressure-sensitive surface and two conductive membranes provided so as to sandwich the piezoelectric membrane. The piezoelectric membrane has a heat source detection function. The operating body detection device further includes a voltage detecting unit that detects a potential difference generated between the two conductive membranes and a current detecting unit that detects a current generated in the piezoelectric membrane through the two conductive membranes. FIG. 33 is a diagram illustrating the configuration of such an operating body detection device. As illustrated in FIGS. 33(a) and 33(b), a laminated structure 100F included in an operating body detection device 200F has a similar configuration to that of the pressure sensor 20 illustrated in FIGS. 3(a) and 3(b). As illustrated in FIG. 33(c), the circuit configuration of the operating body detection device 200F has a similar configuration to that of the pressure sensor circuit illustrated in FIG. 5. According to the operating body detection device 200F, the laminated structure 100F having a simple structure can be used to have the function of a pressure sensor and the function of a heat source sensing sensor.

DESCRIPTION OF REFERENCE NUMERALS

10 Capacitance-type sensor
11 First electrode
11A Set of first electrodes
11A1 First partial electrode
12 Second electrode
12A Set of second electrodes
12A1 Second partial electrode
13 Substrate
20 Pressure sensor
20A Pressure sensor
21 First transparent conductive membrane
21A Set of first transparent electrodes
21A1 First transparent partial electrode
22 Second transparent conductive membrane
22A Set of second transparent electrodes
22A1 Second transparent partial electrode
23 Piezoelectric membrane
25 Heat source sensing sensor
25A Piezoelectric membrane
25B Transparent conductive membrane
25C Transparent conductive membrane
30 Transparent joining member
100 Laminated structure
100A Laminated structure
100B Laminated structure
100C Laminated structure
100D Laminated structure
100E Laminated structure
100F Laminated structure
200 Operating body detection device
200A Operating body detection device
200B Operating body detection device
200C Operating body detection device
200D Operating body detection device
200E Operating body detection device
200F Operating body detection device
201 Power supply
202 Voltage measuring unit
203 Current measuring unit
205 Pressure sensor circuit
206 Capacitance-type sensor circuit
210 Control unit
211 Drive unit
212 Detection unit
213 Multiplexer
221 First one-purpose electrode
222 Second one-purpose electrode
231 First dual-purpose electrode
232 Second dual-purpose electrode
300 Cover panel
301 Decorative layer
400 Display device
1000 Input/output device
1000A Input/output device BE Bridge wiring
OB Operating body
OB1 Operating body
OB2 Operating body

The invention claimed is:

1. An operating body detection device comprising:
a laminated structure comprising:
a capacitance-type sensor having a capacitance sensing surface on which a plurality of sensing electrodes is arranged,
a transparent joining member, and
a heat source sensing sensor comprising a heat source sensing film having a heat source sensing membrane with a heat source sensing surface, the heat source sensing sensor comprising:
a piezoelectric membrane,
a first transparent conductive membrane, and
a second transparent conductive membrane,
the first transparent conductive membrane and the second transparent conductive membrane being provided on both sides of the piezoelectric membrane in a thickness direction, and the piezoelectric membrane functioning as the heat source sensing membrane.

2. The operating body detection device according to claim 1, further comprising:
a detection surface that detects an operating body, the detection surface being a region in which the capacitance sensing surface and the heat source sensing surface overlap when viewed from a normal direction of the detection surface.

3. The operating body detection device according to claim 1, wherein the heat source sensing membrane has a light transmittance in a range of 90% or more in a wavelength range from 380 nm to 800 nm.

4. The operating body detection device according to claim 1, further comprising:
a control unit that controls the capacitance-type sensor and the heat source sensing sensor,
wherein the control unit starts a heat source measurement with the heat source sensing sensor on condition that an object is detected with the capacitance-type sensor.

5. The operating body detection device according to claim 1, wherein the piezoelectric membrane outputs an output signal related to heat source sensing via the first transparent conductive membrane and the second transparent conductive membrane.

6. A detection method for an operating body using the operating body detection device according to claim 1, comprising:
when sensing presence of an object around the capacitance sensing surface with the capacitance-type sensor and sensing presence of a heat source around the heat source sensing surface with the heat source sensing sensor, determining that the object sensed with the capacitance-type sensor is the operating body.

7. The detection method for an operating body according to claim 6, comprising:
starting a heat source measurement with the heat source sensing sensor on condition that the object is detected with the capacitance-type sensor.

8. An input/output device comprising:
the operating body detection device according to claim 1; and
a display device provided on a surface of the operating body detection device opposite to an operation side,
wherein the operating body detection device has translucency, and
at least a part of an image from the display device is visually recognized from the operation side of the operating body detection device.

9. The input/output device according to claim 8, further comprising:
a decorative layer on the operation side of the operating body detection device.

10. The operating body detection device according to claim 1, further comprising:
a sensor circuit, the sensor circuit comprising a power supply and a current measuring unit that measures current flowing through the piezoelectric membrane between the first transparent conductive membrane and the second transparent conductive membrane, an output of the current measuring unit allowing to detect whether a heat source is present in a vicinity of the piezoelectric membrane.

11. A detection method for an operating body using an operating body detection device comprising:
a capacitance-type sensor having a capacitance sensing surface on which a plurality of sensing electrodes is arranged, and
a pressure sensor comprising a pressure sensing film that has a piezoelectric membrane having a pressure-sensitive surface and two conductive membranes provided so as to sandwich the piezoelectric membrane, one or more of the two conductive membranes is patterned, and the pressure sensor is configured to individually detect pressure at a plurality of positions in the pressure-sensitive surface,
wherein a detection surface that detects an operating body has a region in which the capacitance sensing surface and the pressure-sensitive surface overlap when viewed from a normal direction of the detection surface,
the detection method comprising:
sensing an object with the capacitance-type sensor;
sensing pressing by the object with the pressure sensor; and
if the object is sensed with the capacitance-type sensor and is sensed pressing by the pressure sensor, determining that the object is the operating body,
wherein the operating body detection device has one or more features selected from the group consisting of:
in-plane resolution of a capacitance change measurement on the capacitance sensing surface of the capacitance-type sensor being higher than in-plane resolution of pressure measurement on the pressure-sensitive surface of the pressure sensor, and
the pressure sensor being configured to divisionally measure pressure on the pressure-sensitive surface, and if an object is detected with the capacitance-type sensor, the pressure sensor measuring the pressure using a portion of the pressure-sensitive surface at which coordinates on the pressure-sensitive surface that corresponds to coordinates of the object detected with the capacitance-type sensor on the capacitance sensing surface are positioned.

12. An operating body detection device comprising:
a laminated structure comprising:
a capacitance-type sensor comprising a plurality of sensing electrodes, and
a heat source sensing sensor comprising a heat source sensing film having a heat source sensing membrane with a heat source sensing surface, wherein the heat source sensing sensor comprises a piezoelectric membrane and a transparent conductive membrane, wherein the plurality of sensing electrodes is formed on a first surface of the piezoelectric membrane, the transparent conductive membrane is provided on a second surface of the piezoelectric membrane opposite to the first surface, and the piezoelectric membrane functioning as the heat source sensing membrane, wherein in a first sensing mode, the plurality of sensing electrodes are configured to function as the capacitance-type sensor, and wherein in a second sensing mode, the plurality of sensing electrodes are configured to function as the heat source sensing sensor.

13. The operating body detection device according to claim 12, further comprising:

a detection surface that detects an operating body, the detection surface being a region in which a capacitance sensing surface and the heat source sensing surface overlap when viewed from a normal direction of the detection surface.

14. The operating body detection device according to claim 12, wherein the heat source sensing membrane has a light transmittance in a range of 90% or more in a wavelength range from 380 nm to 800 nm.

15. The operating body detection device according to claim 12, further comprising:

a control unit that controls the capacitance-type sensor and the heat source sensing sensor, wherein the control unit starts a heat source measurement with the heat source sensing sensor on condition that an object is detected with the capacitance-type sensor.

16. The operating body detection device according claim 12, wherein the piezoelectric membrane outputs an output signal related to heat source sensing via the plurality of sensing electrodes, the first transparent conductive membrane, and the second transparent conductive membrane.

17. The operating body detection device according claim 12, wherein the piezoelectric membrane includes a copolymer of vinylidene fluoride (VDF) and trifluoroethylene (TrFE).

18. The operating body detection device according claim 17, wherein the copolymer comprises a mixture comprising a first copolymer and a second copolymer, the first copolymer having a copolymerization ratio of VDF from 82 to 90% relative to TrFE from 18 to 10%, in a molar ratio, and the second copolymer having a copolymerization ratio of VDF from 60 to 82% relative to TrFE from 40 to 18%, in a molar ratio.

* * * * *